US008116688B2

(12) United States Patent  
Matsumoto et al.

(10) Patent No.: US 8,116,688 B2
(45) Date of Patent: Feb. 14, 2012

(54) WIRELESS APPARATUS, WIRELESS COMMUNICATION SYSTEM, CONTROL METHOD, AND CONTROL PROGRAM

(75) Inventors: Akira Matsumoto, Tokyo (JP); Tetsuya Ito, Tokyo (JP); Kenichi Abe, Tokyo (JP); Hiroaki Ueno, Tokyo (JP); Yoko Suzuki, Tokyo (JP); Dai Someya, Tokyo (JP); Naoki Yokoyama, Hokkaido (JP); Akira Shimomura, Hokkaido (JP)

(73) Assignee: NEC Communications Systems, Ltd., Tokyo (JP)

( * ) Notice: Subject to any disclaimer, the term of this patent is extended or adjusted under 35 U.S.C. 154(b) by 547 days.

(21) Appl. No.: 12/331,486

(22) Filed: Dec. 10, 2008

(65) Prior Publication Data

US 2009/0146866 A1 Jun. 11, 2009

(30) Foreign Application Priority Data

Dec. 10, 2007 (JP) ................. 2007-318953

(51) Int. Cl.
*H04B 1/00* (2006.01)
(52) U.S. Cl. ................... 455/63.1; 455/67.13
(58) Field of Classification Search .......... 370/328, 370/338; 455/67.13, 63.1
See application file for complete search history.

(56) References Cited

U.S. PATENT DOCUMENTS

| 2003/0002456 A1* | 1/2003 | Soomro et al. ............... 370/328 |
| 2005/0128982 A1* | 6/2005 | Kitchin ....................... 370/332 |
| 2007/0135057 A1* | 6/2007 | Nallapureddy et al. ... 455/67.13 |

FOREIGN PATENT DOCUMENTS

| JP | 2004-534480 | 11/2004 |
| JP | 2005-020162 | 1/2005 |
| JP | 2006-033289 | 2/2006 |
| JP | 2006-303695 | 11/2006 |
| JP | 2007-005897 | 1/2007 |

OTHER PUBLICATIONS

Part 11: Wireless LAN Medium Access Control (MAC) and Physical Layer (PHY) Specifications, ANSI/IEEE Std 802.11, 1999 Edition.

* cited by examiner

*Primary Examiner* — Jean Jeanglaude
(74) *Attorney, Agent, or Firm* — Young & Thompson

(57) ABSTRACT

A wireless apparatus which can realize a DFS function that avoidance of interference with radar is considered in an Ad-Hoc mode under a multihop circumstance is provided. A Beacon frame is transmitted at a shorter interval than a previously set interval when radar is detected by wireless apparatuses N1 to N6 which have a DFS function which perform avoidance of interference with radar.

32 Claims, 27 Drawing Sheets

FIG. 5

IBSS DFS ELEMENT FORMAT (OCTET)

(A)

| Element ID(1) | Length(1) | DFS Owner(6) | DFS Recovery Interval(1) | Channel Map (2*N) |
|---|---|---|---|---|

CHANNEL SWITCH ANNOUNCEMENT ELEMENT FORMAT (OCTET)

(B)

| Element ID(1) | Length(1) | Channel Switch Mode(1) | New Channel Number(1) | Channel Switch Count(1) |
|---|---|---|---|---|

QUIET ELEMENT FORMAT (OCTET)

(C)

| Element ID (1) | Length (1) | Quiet Count (1) | Quiet Period(1) | Quiet Duration(2) | Quiet Offset(2) |
|---|---|---|---|---|---|

VALUE OF ACTION FIELD

| Action Field Value | Description |
|---|---|
| 0 | Measurement Request |
| 1 | Measurement Report |
| 2 | TPC Request |
| 3 | TPC Response |
| 4 | Channel Switch Announcement |
| 5-255 | Reserved |

(B)

SUB TYPE LIST OF FRAME CONTROL

| SUB TYPE | SUB TYPE DESCRIPTION |
|---|---|
| 0000 | Association Request |
| 0001 | Association Response |
| 0010 | Reassociation Request |
| 0011 | Reassociation Response |
| 0100 | Probe Request |
| 0101 | Probe Response |
| 1000 | Beacon |
| 1001 | ATIM |
| 1010 | Disassociation |
| 1011 | authentication |
| 1100 | Deauthentication |
| 1101 | Action |
| 0110-0111 1110-1111 | Reserved |

WIRELESS APPARATUS, WIRELESS COMMUNICATION SYSTEM, CONTROL METHOD, AND CONTROL PROGRAM

This application is based upon and claims the benefit of priority from Japanese patent application No. 2007-318953, filed on Dec. 10, 2007, the disclosure of which is incorporated herein in its entirety by reference.

BACKGROUND OF THE INVENTION

1. Technical Field

The present invention relates to a wireless apparatus, a wireless communication system, a control method, and a control program, and particularly, to a wireless apparatus, a wireless communication system, a control method, and a control program which perform a Dynamic Frequency Selection (DFS) function in an Ad-Hoc mode under a multihop circumstance A.

2. Background Art

Among wireless LAN standards standardized as IEEE 802.11, there is IEEE 802.11h. In this IEEE 802.11h, there are two functions: a Transmit Power Control (TPC) for controlling transmit power; and a Dynamic Frequency Selection (DFS) for controlling a spectrum.

The TPC function requires a wireless LAN system side to mount a transmit power control function for reducing affection of interference with a satellite system which uses the same frequency band.

The DFS function requires a wireless LAN system side to mount a radar detection function and a channel moving function for avoiding an operation in the same channel as radar system which uses the same frequency band as a wireless LAN standard.

For example, the DFS function specified in the IEEE 802.11h requires a wireless LAN system side to mount a radar detection function so that a wireless LAN system does not operate in the same frequency band as radar system. If radar is detected when a wireless LAN system starts and is performing its operation, it is required to switch to other channels.

As described above, the DFS function specified in the IEEE 802.11h is a requirement of a wireless LAN system side, but it is reality that the DFS function specified in the IEEE 802.11h described above is not realized in an Ad-Hoc mode under a multihop circumstance. In this regard, there is a need for developing a system for realizing the DFS function that avoidance of interference with radar is considered in an Ad-Hoc mode under a multihop circumstance.

As a technical reference filed before the present invention, there is a reference which discloses a technology that realizes a non-communication period that no interference waves are generated from an adjacent Basic Service Set (BSS) as well as from its own BSS to thereby detect radar in a state that unnecessary waves are small (for example, see Japanese Patent Application Laid-Open No. 2006-303695).

Also, there is a reference which discloses a technology that high speed wireless communication is carried out using a wide frequency band bundling a plurality of channels while coexisting with radar even when the same communication band is used by an interference source such as radar (for example, see Japanese Patent Application Laid-Open No. 2007-5897).

Also, there is a reference which discloses a technology for interpolating a dynamic frequency selection into a Basic Service Set (BSS) and an Independent Basic Service Set (IBSS) of an IEEE 802.11 wireless network (for example, see Japanese Patent Application National Publication No. 2004-534480).

Also, there is a reference which discloses a technology that multihop is performed based on a protocol which uses metrics to raise frequency usage efficiency under a communication circumstance that a communication operation of each communication station is autonomously, decentrally performed (for example, see Japanese Patent Application Laid-Open No. 2006-33289).

Also, there is a reference which discloses a technology that all terminals switch frequency channels at the same time in an Ad-Hoc multihop wireless network (for example, see Japanese Patent Application Laid-Open No. 2005-20162).

Also, there is a reference which discloses a scan method of active scan or passive scan or a technology of a spectrum or a spectrum mask (for example, see ISO/IEC 8802-11 IEEE Std 802.11 Second edition 2005-08-01 ISO/IEC 8802 11:2005 (E) IEEE Std 802.11i-2003 Edition, Information technology—Telecommunications and information exchange between systems—Local and metropolitan area networks—Specific requirements Part 11: Wireless LAN Medium Access Control (MAC) and Physical Layer (PHY) specifications (Includes IEEE Std 802.11, 1999 Edition; IEEE Std 802.11a.-1999; IEEE Std 802.11b.-1999; IEEE Std 802.11b.-1999/Cor 1-2001; and IEEE Std 802.11d.-2001)).

Also, Japanese Patent Application Laid-Open No. 2006-303695 describes that synchronization with an adjacent BSS is realized in a state that any Beacon Interval is set for each BSS. However, Japanese Patent Application Laid-Open No. 2006-303695 has an object of detecting radar in a state that unnecessary waves are small by synchronizing a non-communication state and thus does not realize the DFS function that avoidance of interference with radar is considered.

Also, Japanese Patent Application Laid-Open No. 2007-5897 describes a technology for coexisting with radar even though interference source such as radar uses the same communication band. However, Japanese Patent Application Laid-Open No. 2007-5897 is an invention which is aimed at an Infrastructure mode and does not realize the DFS function that avoidance of interference with radar is considered in an Ad-Hoc mode.

Also, Japanese Patent Application National Publication No. 2004-534480 discloses that information of a channel switch is transmitted using a Beacon which is autonomously, decentrally created. During radar detection, a channel switch has to be performed within a channel move time, and the number of Beacons which can be transmitted within a Channel Move Time is limited. Therefore, under a multihop circumstance using an Ad-Hoc mode, only several nodes perform a channel switch, and thus a communication between nodes may be disconnected. For this reason, a technology disclosed in Japanese Patent Application National Publication No. 2004-534480 cannot realize the DFS function that avoidance of interference with radar is considered in an Ad-Hoc mode.

Also, Japanese Patent Application Laid-Open No. 2006-33289 describes that multihop is performed under a communication circumstance that a communication operation is autonomously, decentrally performed. Also, Japanese Patent Application Laid-Open No. 2005-20162 describes that in case where a plurality of frequency channels are available, all terminals switch frequency channels at the same time in order to switch (DFS) to discrete frequency channels. However, Japanese Patent Application Laid-Open No. 2006-33289 and Japanese Patent Application Laid-Open No. 2005-20162 do not attempt the DFS function that avoidance of interference with radar is considered at all.

SUMMARY

The present invention is devised in consideration of the above problems, and it is an object of the present invention to provide a wireless apparatus, a wireless communication system, a control method, and a control program that the DFS function that avoidance of interference with radar is considered in an Ad-Hoc mode under a multihop circumstance can be realized.

In order to achieve the above object, the present invention has the following features.
Wireless Apparatus>

The present invention provides a wireless apparatus, including: a DFS (Dynamic Frequency Selection) function which performs avoidance of interference with radar, wherein when radar is detected, a Beacon frame is transmitted at a shorter transmission interval than a previously set transmission interval.

The present invention also provides a wireless apparatus, including: a DFS (Dynamic Frequency Selection) function which performs avoidance of interference with radar, wherein when a CSA (Channel Switch Announcement) frame is received, a CSA frame including a CSA element included in the CSA frame is transmitted.

The present invention also provides a wireless apparatus, including: a DFS (Dynamic Frequency Selection) function which performs avoidance of interference with radar, wherein the wireless apparatus manages a resumption time that becomes a DFS Owner or a resumption time that enters a DFS Owner Recovery mode to assume the role of DFS Owner, compares the managed time to a resumption time that another wireless apparatus becomes a DFS Owner, and controls for quitting a DFS Owner according to the comparison result.

The present invention also provides a wireless apparatus, including: a DFS (Dynamic Frequency Selection) function which performs avoidance of interference with radar, wherein identification information for uniquely identifying each apparatus is included in a CSA (Channel Switch Announcement) frame, and when a plurality of CSA frames are received, a CSA frame to be adopted by the wireless apparatus among the plurality of CSA frames is determined according to identification information included in the CSA frame.

The present invention also provides a wireless apparatus, including: a DFS (Dynamic Frequency Selection) function which performs avoidance of interference with radar, and a unit for notifying a channel list which is an index for a channel switch to an adjacent wireless apparatus when detecting radar.

The wireless apparatus further includes a unit for measuring a received signal level for each radio channel and predicting an interference area of a radio channel that channel interference occurs for each radio channel, based on the received signal level of each radio channel and a unit for creating the channel list based on the interference area of the radio channel predicted for each radio channel.

The present invention also provides a wireless apparatus, including: a DFS (Dynamic Frequency Selection) function which performs avoidance of interference with radar, wherein when a Beacon frame is received, if a Quiet Count included in the Beacon frame is smaller in value than a Quiet Count of the wireless apparatus, the Quiet Count of the wireless apparatus is changed to the Quiet Count included in the Beacon frame, and if the Quiet Count included in the Beacon frame is larger in value than the Quiet Count of the wireless apparatus, and the wireless apparatus controls for ignoring the Beacon frame.

The present invention also provides a wireless apparatus, including: a DFS (Dynamic Frequency Selection) function which performs avoidance of interference with radar; a plurality of wireless interfaces; a management unit for managing information of a channel when a first wireless interface detects radar; and a control unit by priority controlling switching to a channel other than a channel managed by the management means when switching a channel of a second wireless interface.
<Wireless Communication System>

The present invention provides a wireless communication system, including: a plurality of wireless apparatuses described above.
<Control Method>

The present invention also provides a control method which is performed in a wireless apparatus which has DFS (Dynamic Frequency Selection) function which performs avoidance of interference with radar, including a step of: when radar is detected, transmitting a Beacon frame at a shorter transmission interval than a previously set transmission interval.

The present invention also provides a control method which is performed in a wireless apparatus which has DFS (Dynamic Frequency Selection) function which performs avoidance of interference with radar, including a step of: when a CSA (Channel Switch Announcement) frame is received, transmitting a CSA frame including a CSA element included in the CSA frame.

The present invention also provides a control method which is performed in a wireless apparatus which has DFS (Dynamic Frequency Selection) function which performs avoidance of interference with radar, including a step of: managing a resumption time that becomes a DFS Owner or a resumption time that enters a DFS Owner Recovery mode to assume the role of DFS Owner, comparing the managed time to a time that another wireless apparatus becomes a DFS Owner, and controlling for quitting a DFS Owner according to the comparison result.

The present invention also provides a control method which is performed in a wireless apparatus which has DFS (Dynamic Frequency Selection) function which performs avoidance of interference with radar, including a step of: when a plurality of CSA (Channel Switch Announcement) frames in which identification information for uniquely identifying each apparatus is included are received, determining a CSA frame to be adopted by the wireless apparatus among the plurality of CSA frames according to identification information included in the CSA frame.

The present invention also provides a control method which is performed in a wireless apparatus which has DFS (Dynamic Frequency Selection) function which performs avoidance of interference with radar, including a step of: notifying a channel list which is an index for a channel switch to an adjacent wireless apparatus when detecting radar.

The present invention also provides a control method which is performed in a wireless apparatus which has DFS (Dynamic Frequency Selection) function which performs avoidance of interference with radar, including a step of: when a Beacon frame is received, changing a Quiet Count of the wireless apparatus to a Quiet Count included in the Beacon frame if the Quiet Count included in the Beacon frame is smaller in value than the Quiet Count of the wireless apparatus, and controlling for ignoring the Beacon frame if the Quiet Count included in the Beacon frame is larger in value than the Quiet Count of the wireless apparatus.

The present invention also provides a control method which is performed in a wireless apparatus which has DFS (Dynamic Frequency Selection) function which performs avoidance of interference with radar and a plurality of wireless interfaces, including a step of: managing information of a channel when a first wireless interface detects radar; and controlling by priority for switching to a channel other than a channel managed by the management steps when switching a channel of a second wireless interface.

The present invention also provides a computer-readable medium storing a control program which allows a wireless apparatus which has a DFS (Dynamic Frequency Selection) function which performs avoidance of interference with radar to execute a processing of: when radar is detected, transmitting a Beacon frame at a shorter transmission interval than a previously set transmission interval.

The present invention also provides a computer-readable medium storing a control program which allows a wireless apparatus which has a DFS (Dynamic Frequency Selection) function which performs avoidance of interference with radar to execute a processing of: when a CSA (Channel Switch Announcement) frame is received, transmitting a CSA frame including a CSA element included in the CSA frame.

The present invention also provides a computer-readable medium storing a control program which allows a wireless apparatus which has a DFS (Dynamic Frequency Selection) function which performs avoidance of interference with radar to execute a processing of: managing a resumption time that becomes a DFS Owner or a resumption time that enters a DFS Owner Recovery mode to assume the role of DFS Owner, comparing the managed time to a resumption time that another wireless apparatus becomes a DFS Owner, and controlling for quitting a DFS Owner according to the comparison result.

The present invention also provides a computer-readable medium storing a control program which allows a wireless apparatus which has a DFS (Dynamic Frequency Selection) function which performs avoidance of interference with radar to execute a processing of: when a plurality of CSA (Channel Switch Announcement) frames in which identification information for uniquely identifying each apparatus is included are received, determining a CSA frame to be adopted by the wireless apparatus among the plurality of CSA frames according to identification information included in the CSA frame.

The present invention also provides a computer-readable medium storing a control program which allows a wireless apparatus which has a DFS (Dynamic Frequency Selection) function which performs avoidance of interference with radar to execute a processing of: notifying a channel list which is an index for a channel switch to an adjacent wireless apparatus when detecting radar.

The present invention also provides a computer-readable medium storing a control program which allows a wireless apparatus which has a DFS (Dynamic Frequency Selection) function which performs avoidance of interference with radar to execute a processing of: when a Beacon frame is received, changing a Quiet Count of the wireless apparatus to a Quiet Count included in the Beacon frame if the Quiet Count included in the Beacon frame is smaller in value than the Quiet Count of the wireless apparatus, and controlling for ignoring the Beacon frame if the Quiet Count included in the Beacon frame is larger in value than the Quiet Count of the wireless apparatus.

The present invention also provides a computer-readable medium storing a control program which allows a wireless apparatus which has a DFS (Dynamic Frequency Selection) function which performs avoidance of interference with radar and has a plurality of wireless interfaces to execute a processing of: managing information of a channel when a first wireless interface detects radar, and controlling by priority switching to a channel other than a channel managed by the management process when switching a channel of a second wireless interface.

According to the present invention, the DFS function that avoidance of interference with radar is considered in an Ad-Hoc mode under a multihop circumstance can be realized.

BRIEF DESCRIPTION OF THE DRAWINGS

FIG. 5A is a view illustrating an example of formats of elements included in a frame shows an IBSS DFS element format;

FIG. 5B is a view illustrating an example of formats of elements included in a frame shows a Channel Switch Announcement element format;

FIG. 5C is a view illustrating an example of formats of elements included in a frame shows a Quiet element format;

FIG. 6A is a view illustrating information included in a frame in order to illustrate a value of an Action field included in a frame;

FIG. 6B is a view illustrating information included in a frame in order to illustrate a sub type of a frame control included in a frame.

EXEMPLARY EMBODIMENTS

Configuration Example of Wireless Communication System

Figure 1:
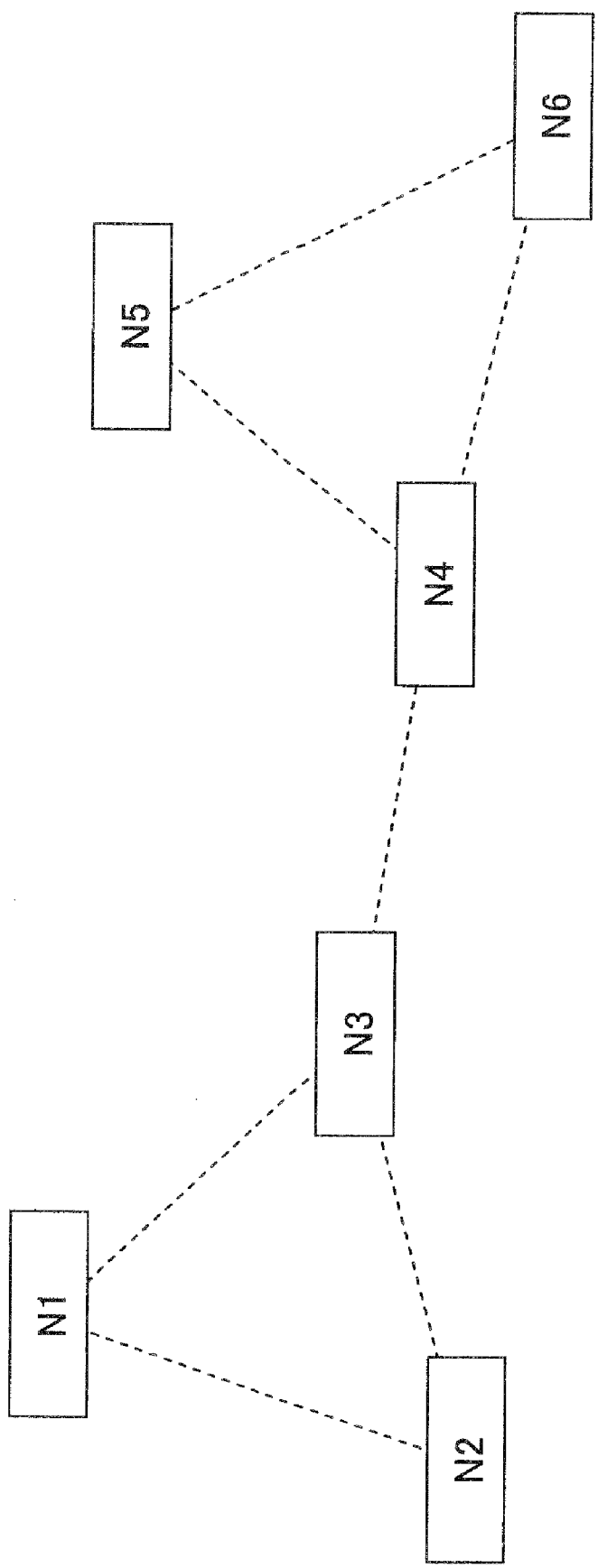
FIG. 1 is a block diagram illustrating an example of a configuration of a wireless communication system according to an exemplary embodiment.

First, an example of a system configuration of a wireless communication system according to an exemplary embodiment will be described with reference to FIG. 1.

The wireless communication system according to the present embodiment includes a plurality of nodes N1 to N6. The nodes N1 to N6 are apparatuses which perform a wireless communication, for example, a wireless base station AP or a wireless terminal apparatus STA etc. FIG. 1 shows six nodes N1 to N6, but the number of nodes included in the wireless communication system according to the present embodiment is not particularly limited. The wireless communication system of FIG. 1 shows a multihop configuration, and a dotted line shows a topology. Therefore, in the wireless communication system according to the present embodiment, for example, the node N1 and the node N3 can communicate directly with each other if they exist within the same radio wave range, and the nodes N1 and the node N4 cannot communicate directly with each other if they do not exist within the same radio wave range.

<Processing Operation of Wireless Communication System>

Next, a processing operation of the wireless communication system according to the present embodiment will be described.

Figure 2:
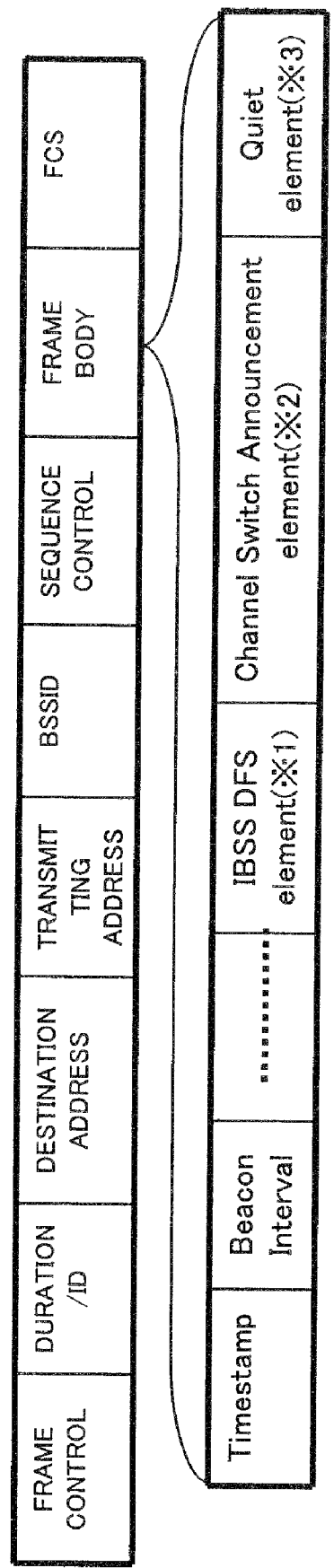
FIG. 2 is a view illustrating an example of a Beacon/Probe Response frame format.
Figure 3:
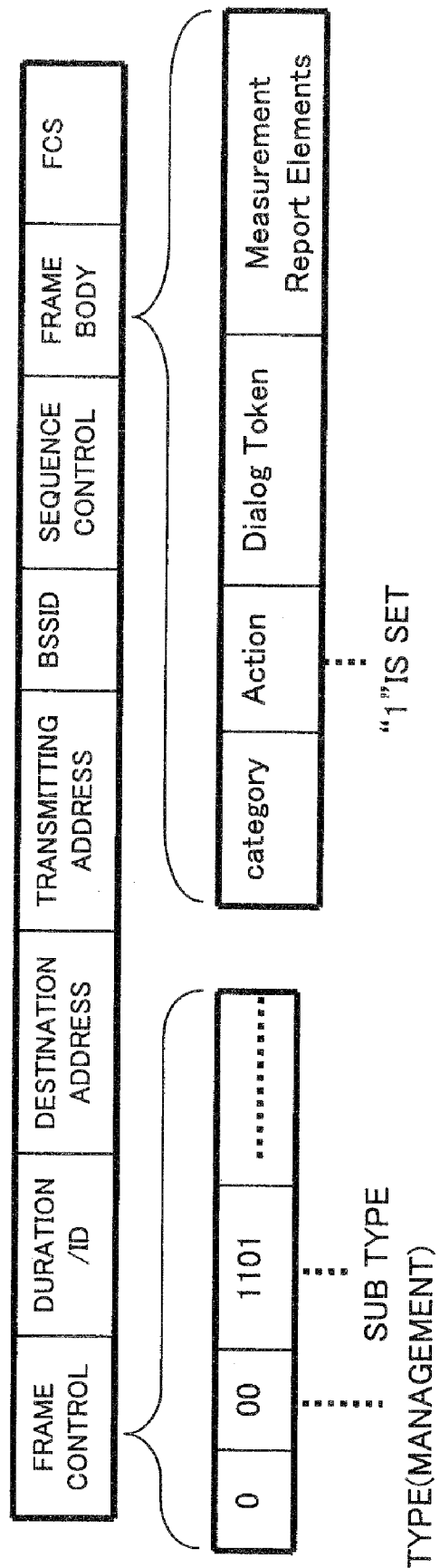
FIG. 3 is a view illustrating an example of a Measurement Report frame format.
Figure 4:
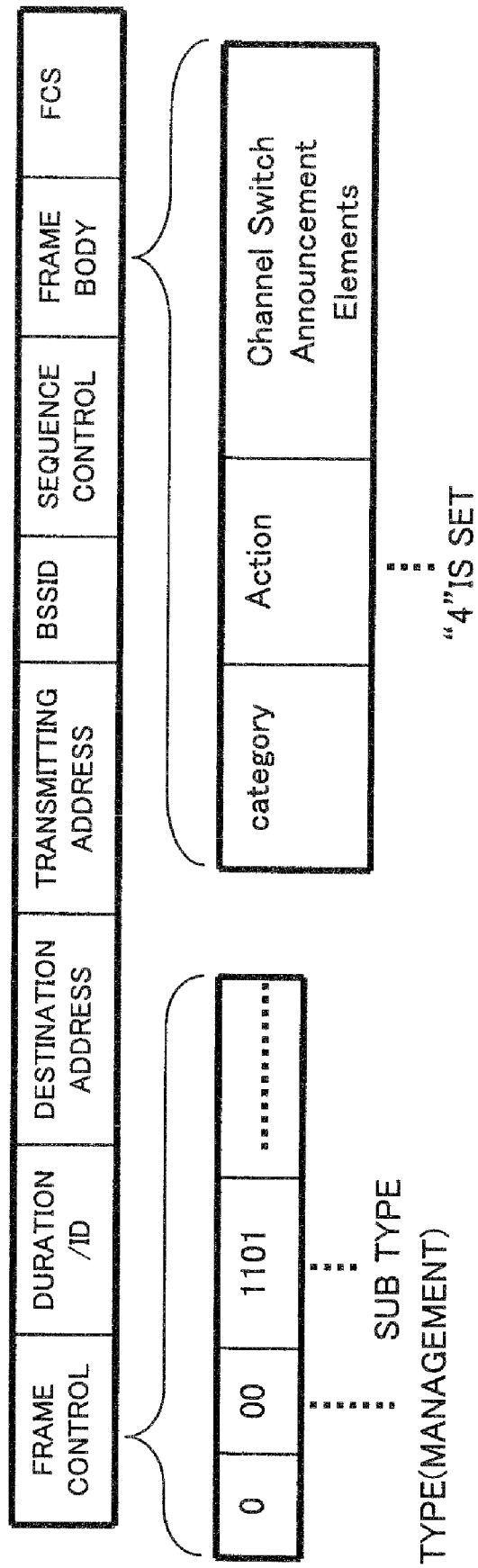
FIG. 4 is a view illustrating an example of a Channel Switch Announcement frame format.

Formats of a Beacon/Probe Response frame, a Measurement Report frame, and a Channel Switch Announcement frame which are transmitted between each node will be first described. FIG. 2 shows an example of a Beacon/Probe Response frame format, FIG. 3 shows an example of a Measurement Report frame format, and FIG. 4 shows an example of a Channel Switch Announcement frame format. FIG. 5 shows an example of formats of elements included in a frame, (a) shows an example of an IBSS DFS element format, (b) shows an example of a Channel Switch Announcement element format, and (c) shows an example of a Quiet element format. FIG. 6 is a view illustrating information included in a frame, (a) is a view illustrating a value of an Action field included in a frame, and (b) is a view illustrating a sub type of a frame control included in a frame.

(Notice Method of DFS Owner)

Figure 7:
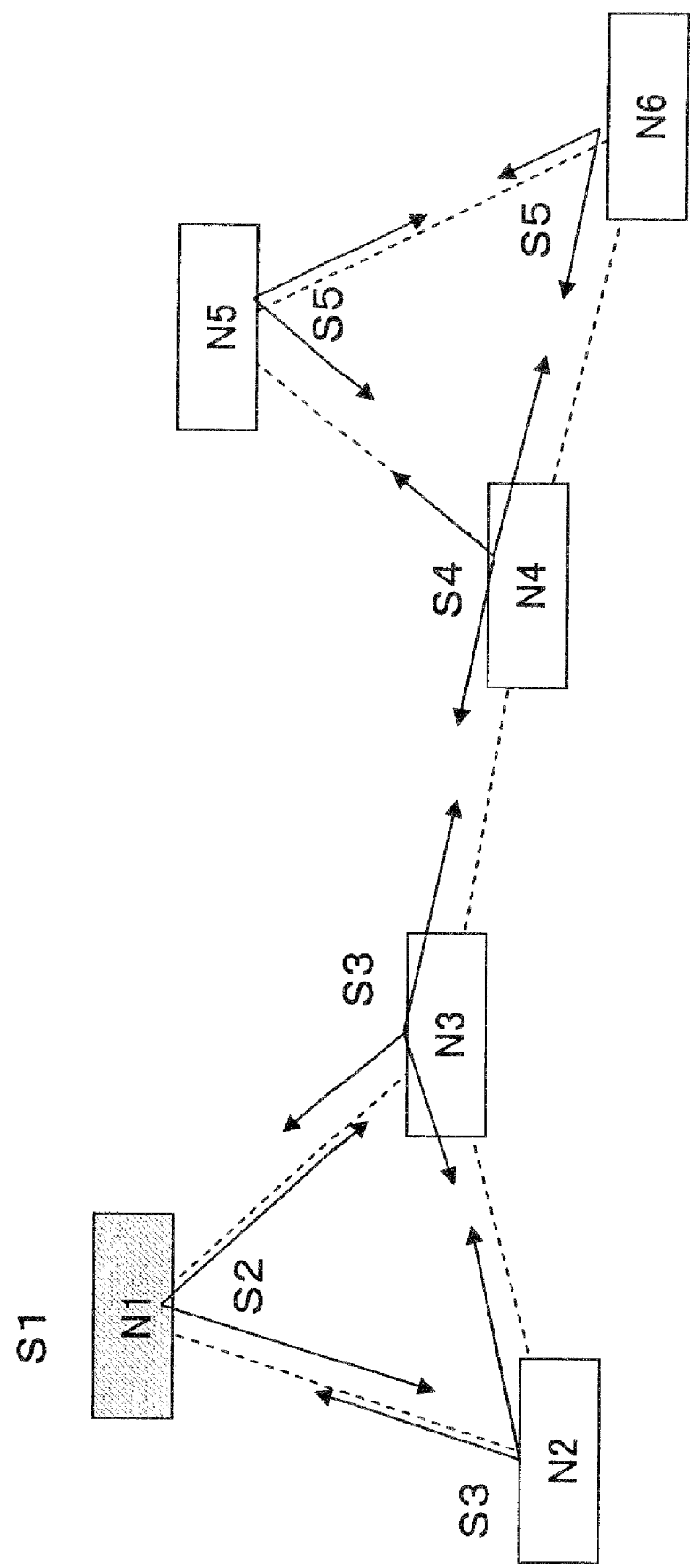
FIG. 7 is a view illustrating a notice method of a DFS Owner.

Next, a processing operation for notifying information on a DFS Owner when a node becomes a DFS Owner will be described with reference to FIG. 7. Here, the DFS Owner means an entity which adjusts a channel switch.

First, assume that the node N1 initiates an Independent Basic Service Set (IBSS). This makes the node N1 a DFS Owner (step S1).

Next, the DFS Owner node N1 transmits a message that the node N1 itself is a DFS Owner to the adjacent nodes N2 and N3 through a Beacon frame or a Probe Response frame (step S2). At this time, the DFS Owner node N1 includes an MAC address of the node N1 in a DFS Owner of the IBSS DFS element included in a Beacon.

The nodes N2 and N3 receives the Beacon frame or the Probe Response frame and determine whether or not a BSSID included in the received frame is identical to BSSIDs of the nodes N2 and N3. If the both BSSIDs are identical, the nodes N2 and N3 compare a Time Stamp included in the frame to TSF timer values of the nodes N2 and N3. If the Time Stamp included in the frame is later than the TSF timer values of the nodes N2 and N3, DFS Owner information, DFS Recovery Interval information and other information are adopted from the IBSS DFS element included in the frame, and a Beacon frame including the adopted information is transmitted to adjacent nodes (step S3). As describes in non patent document 1 (ISO/IEC 8802-11 IEEE Std 802.11 Second edition 2005-08-01 ISO/IEC 8802 11:2005(E) IEEE Std 802.11i-2003 Edition, Information technology—Telecommunications and information exchange between systems—Local and metropolitan area networks—Specific requirements Part 11: Wireless LAN Medium Access Control (MAC) and Physical Layer (PHY) specifications (Includes IEEE Std 802.11, 1999 Edition; IEEE Std 802.11a.-1999; IEEE Std 802b.-1999; IEEE Std 802.11b.-1999/Cor 1-2001; and IEEE Std 802.11d.-2001)), since a Beacon is autonomously, decentrally transmitted, it is impossible for a node to transmit until transmission timing of a Beacon comes. For this reason, it should be understood that transmission is not always performed in this order.

The nodes N4 to N6 which have received the Beacon frame perform same processing as step S3 described above and transmit a Beacon frame including DFS Owner information, DFS Recovery Interval information and other information to adjacent nodes (steps S4 and S5). As a result, each node N2 to N6 recognizes that the node N1 is the DFS Owner.

(When DFS Owner Node Detects Radar)

Figure 8:
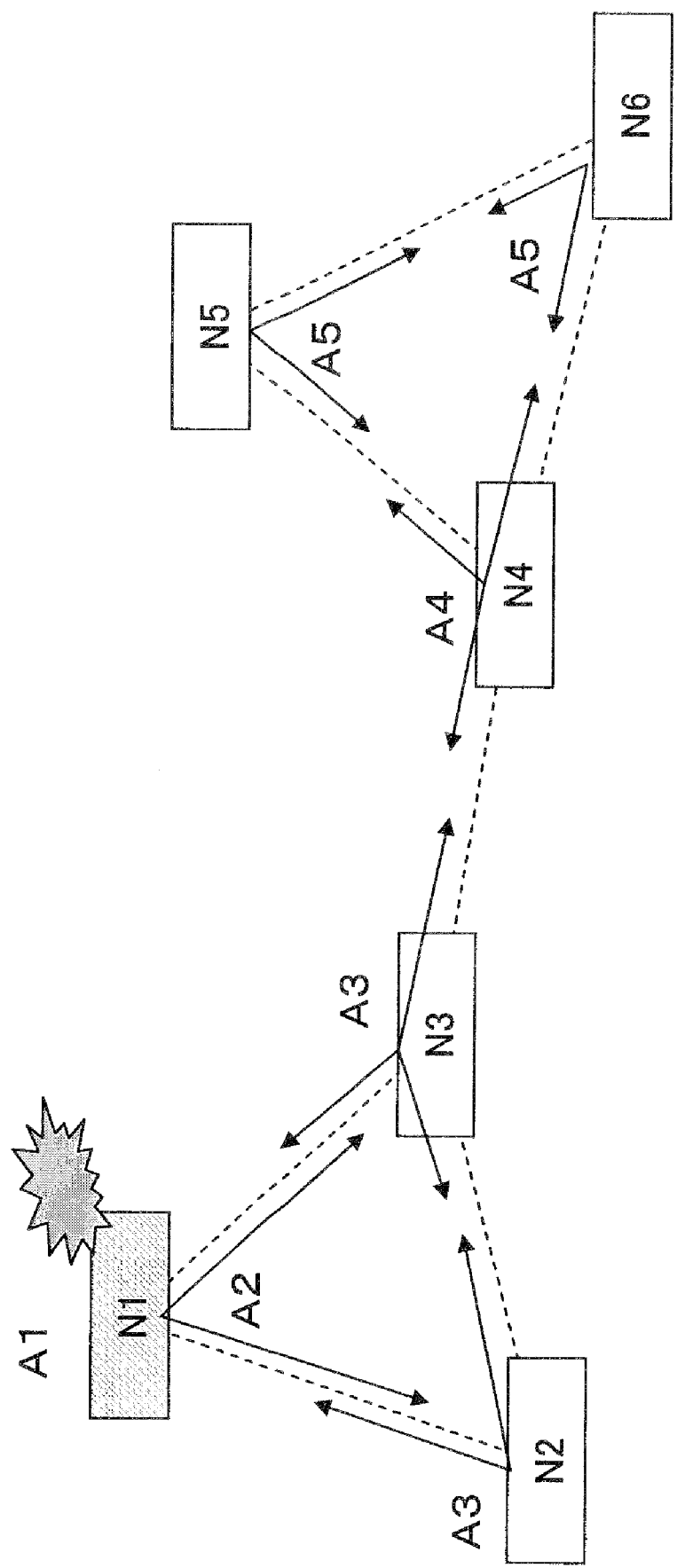
FIG. 8 is a view illustrating a case where a DFS Owner node detects radar.

Next, a processing operation when the DFS Owner node detects radar will be described with reference to FIG. 8.

First, when the DFS Owner node N1 detects radar (step A1), the DFS Owner node N1 transmits (broadcasts) a Channel Switch Announcement (CSA) frame to the adjacent nodes N2 and N3 at least one time (step A2).

The nodes N2 and N3 which receive the CSA frame transmit a CSA element included in the CSA frame to the adjacent nodes through a Beacon frame when it is able to transmit a Beacon (step A3).

The node N4 which has received the Beacon frame transmits the CSA element included in the Beacon frame to the adjacent nodes through a Beacon frame when it is able to transmit a Beacon (step A4). The nodes N5 and N6 which have received the Beacon frame transmit the CSA element included in the Beacon frame to the adjacent nodes through a Beacon frame when it is able to transmit a Beacon in a similar way to step A4 described above (step A5).

(When Node Other than DFS Owner Node Detect Radar: First)

Figure 9:
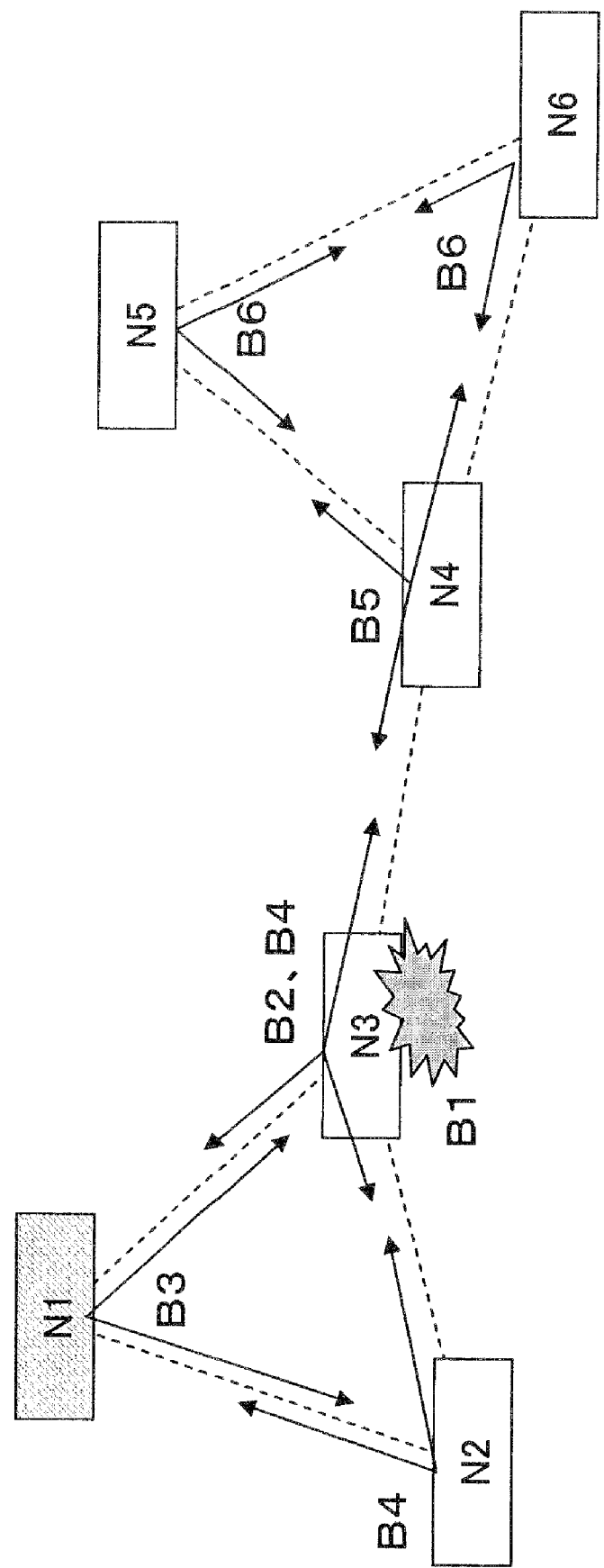
FIG. 9 is a first view illustrating a case where a node other than a DFS Owner node detects radar.

A first processing operation when a node other than the DFS Owner node detects radar will be described with reference to FIG. 9. In below processing, it is assumed that the node N3 within the same radio wave range as the DFS Owner node N1 detects radar.

First, when the node N3 detects radar (step B1), the node N3 transmits (unicasts or broadcasts) a Measurement Report (MR) frame to the adjacent nodes N1, N2 and N4 at least one time (step B2).

The DFS Owner node N1 which has received the MR frame transmits (broadcasts) a CSA element included in the MR frame to the adjacent nodes through CSA frame at least one time (step B3).

The nodes N2 and N3 which have received the CSA frame transmit a CSA element included in the CSA frame to the adjacent nodes through a Beacon frame when it is able to transmit a Beacon (step B4).

The node N4 which has received the Beacon frame transmits a CSA element included in the Beacon frame to the adjacent nodes through a Beacon frame when it is able to transmit a Beacon (step B5). Also, the nodes N5 and N6 which have received the Beacon frame transmits a CSA element included in the Beacon frame to the adjacent nodes through a Beacon frame when it is able to transmit a Beacon in a similar way to step B5 described above (step B6).

(When Node Other than DFS Owner Node Detect Radar: Second)

Figure 10:
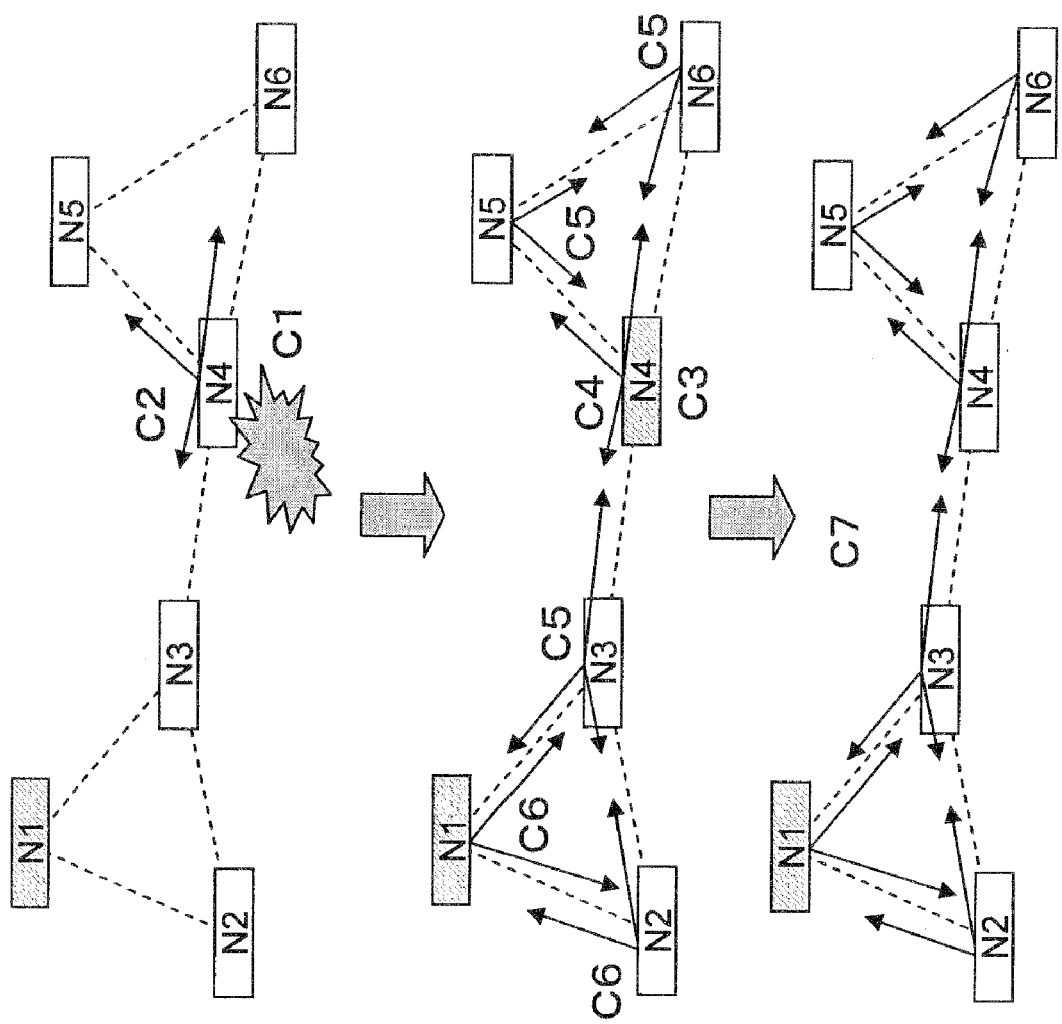
FIG. 10 is a second view illustrating a case where a node other than a DFS Owner node detects radar.

Next, a second processing operation when a node other than the DFS Owner node detects radar will be described with reference to FIG. 10. In below processing, it is assumed that the node N4 within a different radio wave range from the DFS Owner node N1 detects radar.

First, when the node N4 detects radar (step C1), the node N4 transmits (unicasts or broadcasts) a Measurement Report (MR) frame to the adjacent nodes N3, N5 and N6 at least one time (step C2).

The node N4 enters a DFS Owner Recovery mode to assume the role of DFS Owner when it cannot receive a CSA even after a DFS Owner Recovery Interval lapses. But, when it can receive a CSA during a DFS Owner Recovery mode period, the node N4 escapes from the DFS Owner Recovery mode and returns to a DFS Client. Here, a DFS Client means a node which is not a DFS Owner and is not in a DFS Owner Recovery mode.

When the node N4 becomes a DFS Owner (step C3), the node N4 transmits (broadcasts) a CSA frame to the adjacent nodes N3, N5 and N6 at least one time (step C4).

The nodes N3, N5 and N6 which have received the CSA frame transmit a CSA element included in the CSA frame to the adjacent nodes through a Beacon frame when they are able to transmit a Beacon (step C5). Also, the nodes N1 and N2 which have received the Beacon frame transmits a CSA element included in the Beacon frame to the adjacent nodes through a Beacon frame when they are able to transmit a Beacon (step C6).

When a time lapses after a channel switch, the node N4 which became a DFS Owner becomes a DFS Client by an IBSS DFS Element included in the Beacon frame received from the adjacent node (step C7).

(Quiet Mode)

Next, a Quiet mode will be described.

Each node performs scheduling of a Quiet interval by Quiet elements {Quiet Count, Quiet Period, Quiet Duration, Quiet Offset} of a Beacon/Probe Response frame in order to reduce interference with other nodes and to detect the existence of radar.

Quiet elements will be described below.

A Quiet Count is a parameter which shows the number of Beacon frame transmission timings occurring until a non-communication period initiates.

A Quiet Period is a parameter which shows the number of Beacon Intervals occurring while non-communication periods continuously initiates.

A Quiet Duration is a parameter which shows a time of a non-communication period.

A Quiet Offset is a parameter which shows an offset time until a non-communication period initiates from Beacon frame transmission timing of Quiet Count=0.

Figure 11:
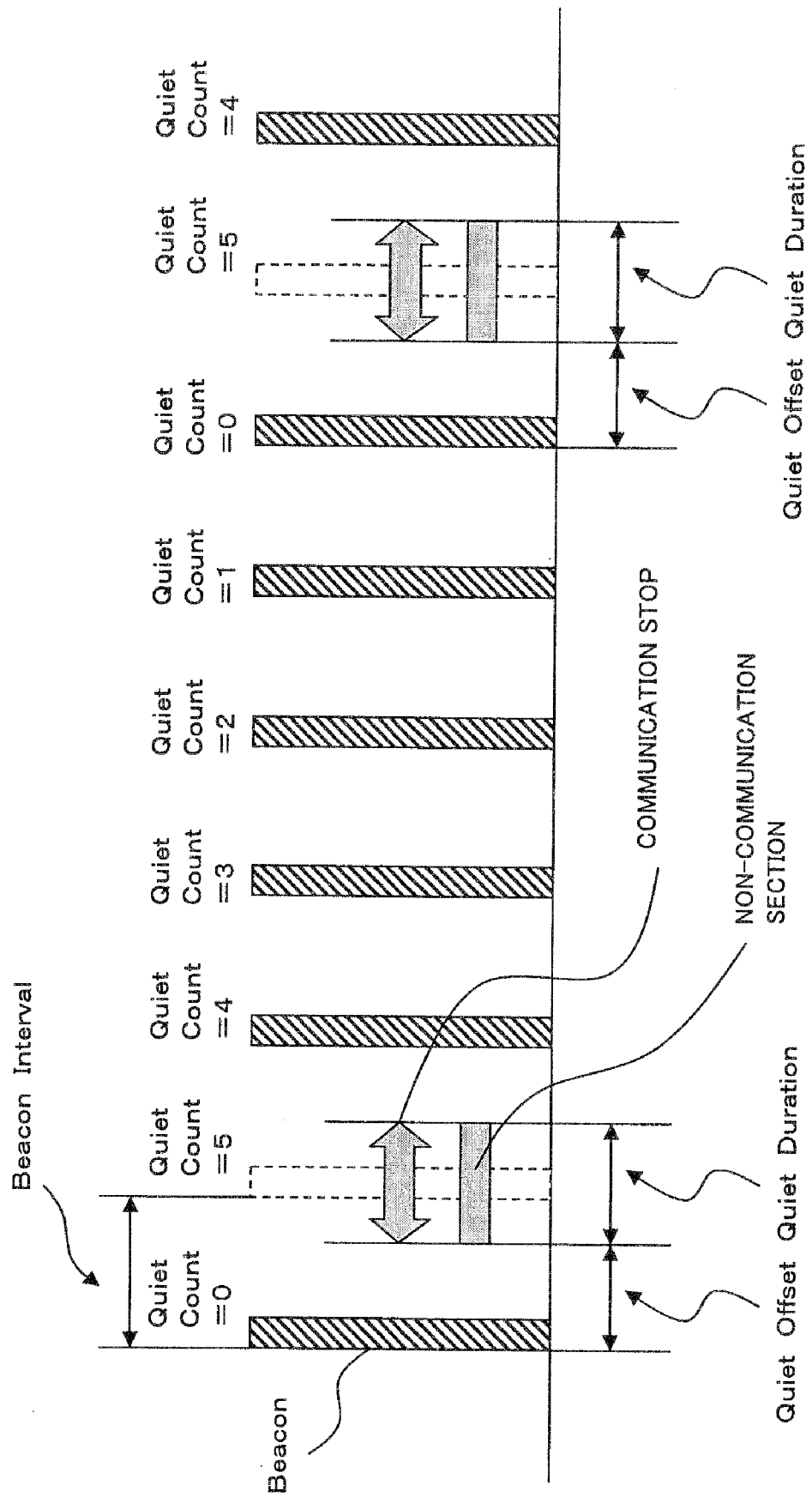
FIG. 11 is a view illustrating a relationship of a Quiet element.

A relationship of the Quiet elements described above is shown in FIG. 11.

Next, a problem and a resolution approach thereof according to the present embodiment will be described below.

(Problem: Each Node is Impossible to Switch to the Same Channel During a Channel Move Time Under a Multihop Circumstance)

First, a problem that each node is impossible to switch to the same channel during a Channel Move Time under a multihop circumstance will be described.

The DFS function specified in ITU-R recommendation M.1652 allows a wireless communication system and a radar system to share the same frequency band in common by avoiding usage of the same frequency as radar operated in the same frequency band, and includes the following main three basic functions.

1: Channel Availability Check (CAC) Function

Before initiating a network on a channel, radar detection is performed for 60 seconds by a radar detection function to ensure that there is no radar operating on the channel. Any transmission is not performed during this time period. When an operating channel is changed, a CAC is also performed even though there is no information as to whether or not a radar signal exists on a next channel.

2: In-Service Monitoring (ISM) Function and Channel Move Time

In order to ensure that there is no radar operating on the channel during the usual operation, the channel is continuously monitored by a radar detection function (In-Service Monitoring).

When a radar signal is detected, the operating channel cannot be used. A node which has detected a radar signal instruct all its associated nodes (communication partner nodes) to stop transmitting on the channel within a Channel Move Time (=10 s).

All transmission during a Channel Move Time is restricted to a Channel Closing Transmission Time (=260 ms).

3: Non-Occupancy Period

A channel that a radar signal is detected dose not resume any transmission during 30 minutes (Non-Occupancy Period) after the signal is detected. A radar detection threshold (Interference Detection Threshold) is specified so that a wireless communication detects radar at an interference level which is 20 to 35 dB lower than a minimum receiving sensitivity of meteorological radar and to avoid interference.

Processing of the DFS function described above is shown in FIG. 12.

Figure 12:
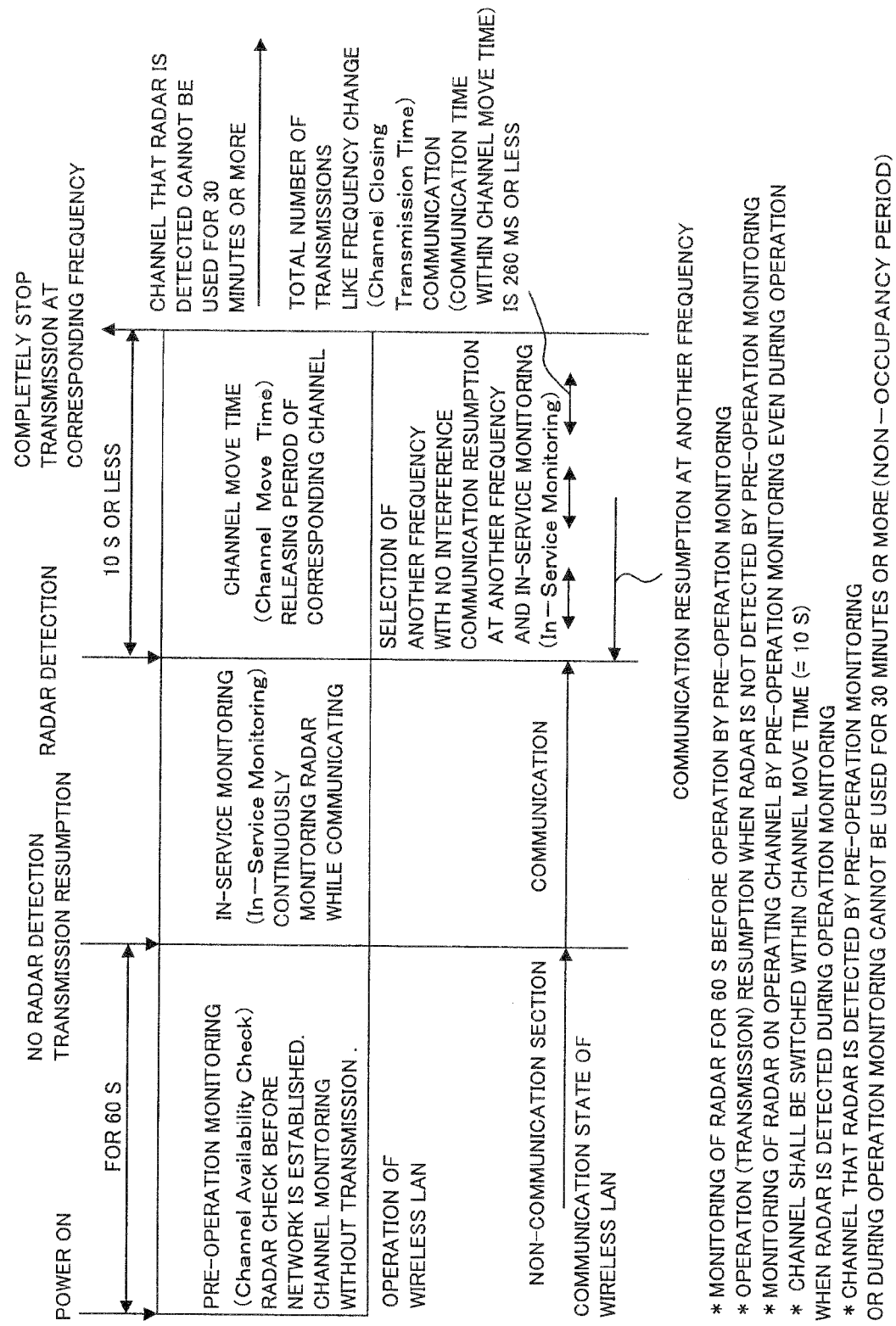
FIG. 12 is a view illustrating outline of processing of a DFS function.

As shown in FIG. 12, when power is turned on, monitoring of radar is performed for 60 seconds by pre-operation monitoring (Channel Availability Check). If radar is not detected by pre-operation monitoring, an operation (transmission) is initiated. Even during an operation (transmission), radar on the in-use channel is monitored during the operation monitoring (In-Service Monitoring). If radar is detected by In-Service Monitoring, the channel is released within a Channel Move Time (=10 s). The channel that detect radar cannot be used for more than 30 minutes (Non-Occupancy Period).

The number of times that a Beacon can be transmitted within a Channel Move Time (=10 s) based on the DFS function specified in the ITU-R recommendation M.1652 describe above will be investigated.

A Channel Move Time is 10 sec, and a Channel Closing Transmission Time is 260 ms.

A Beacon Message is 200 bytes, a wireless standard is 11a, a wireless transmission rate is 6 Mbps, and a Beacon interval is 100 ms.

First, (1) the maximum number of transmission times is computed using a band occupancy time.

PLCP+(PLCP(service)+MAC+LLC+DATA+FCS+
tail) byte/6 Mbps+SIFS+DIFS+BackOff=20 us+
(16 bit+24 byte+8 byte+160 byte+4 byte+6
byte)/6 Mbps+10 us+56 us+average 150 us=285
us+10 us+56 us+150 us=501 us Since a Channel Closing Transmission Time is 260 ms, 260 ms/501 us≈518 times Next, (2) the maximum number of transmission times is computed using a Beacon transmission interval.

10000 ms/100 ms=100 times (3) The number of transmission times necessary for reaching N hops is computed. In the present embodiment, it is approximated by a simple model.

It is assumed that all nodes transmit a Beacon one time, respectively, which is repeated as one cycle.

The number of Beacon transmission cycles c necessary for reaching information from a node of one terminal to a node of the other terminal is as follows.

$c=(N+1)/2$

Also, the number of Beacon transmission times m is as follows.

$m=cN=N(N+1)/2$

If it is assumed that there is no collision, the maximum number of transmission times m is 100 times. If the number of hops N is computed by substituting m=100 to the above equations, N≈13 hops is possible.

Therefore, in order to realize the DFS function specified in the ITU-R recommendation M.1652 described above, under a multihop circumstance, it is necessary to increase the number of hops N.

For this reason, in the present embodiment, an approach below is applied to resolve the above-mentioned problem described above.
(Resolution Approach)

If radar is detected, a Beacon transmission interval is shortened.

A node that detects radar performs an operation for shortening a Beacon internal.

As a result for computing the maximum number of transmission times using a band occupancy time, a Beacon (200 bytes) can be transmitted 518 times during a Channel Move Time.

If it is assumed that there is no collision, the maximum number of transmission times m is 518 times. If the number of hops N is computed by substituting m=518 to the above equations, N≈31 hops is possible.

For this reason, in the present embodiment, a node performs an operation for shortening a Beacon interval when detecting radar, thereby increasing the number of hops N. Accordingly, the DFS function specified in the ITU-R recommendation M.1652 can be realized under a multihop circumstance.

(Problem: a Communication is Disconnected Under a Multihop Circumstance)

Figure 13:
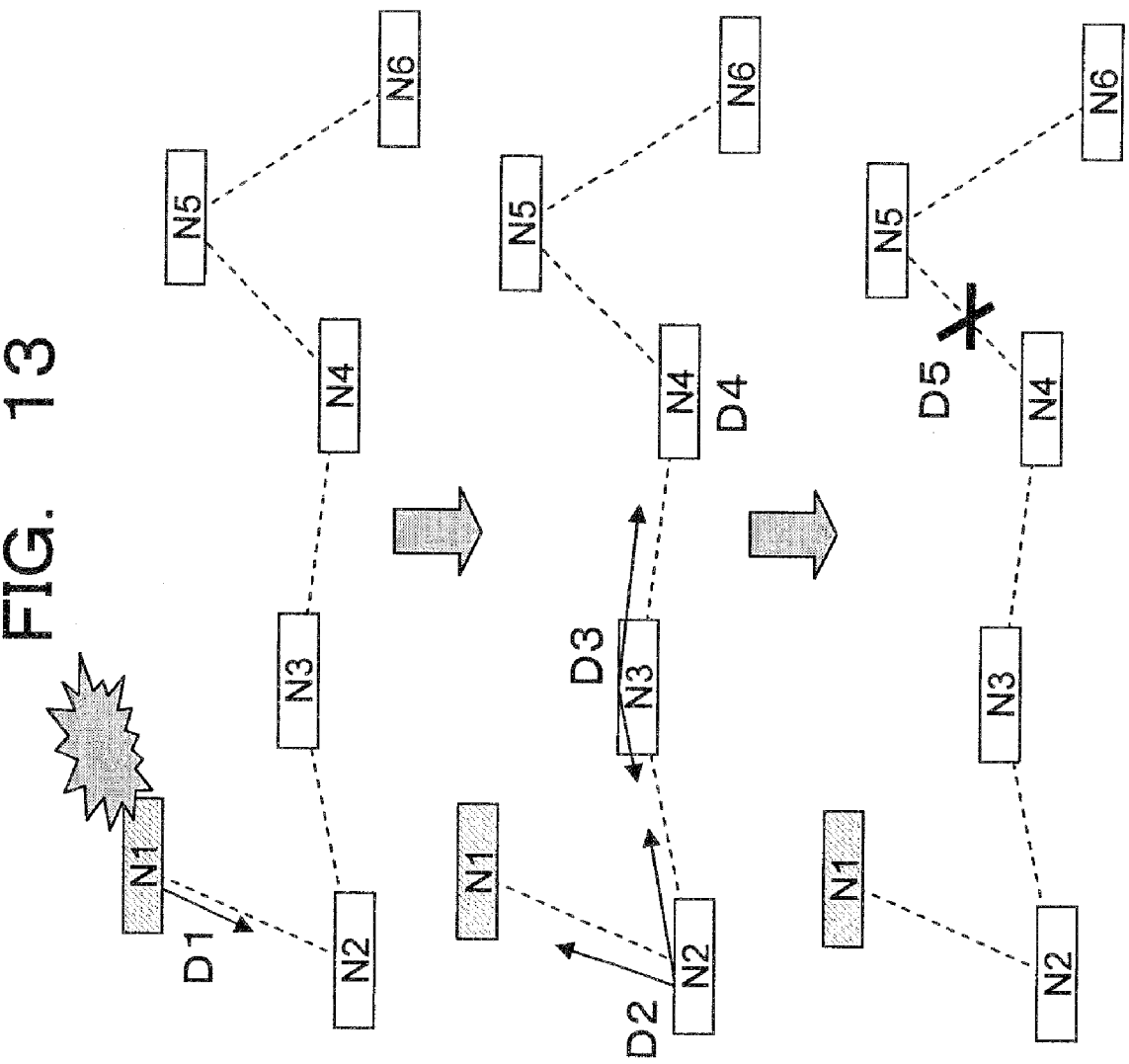
FIG. 13 is a view illustrating a problem in that a communication is disconnected under a multihop circumstance.

Next, a problem that a communication is disconnected under a multihop circumstance will be described with reference to FIG. 13.

First, when the DFS Owner node N1 detects radar, the DFS Owner node N1 transmits (broadcasts) a CSA frame to the adjacent node N2 at least one time (step D1).

The node N2 which has received the CSA frame transmits a CSA element included in the CSA frame to the adjacent nodes through a Beacon frame when it is able to transmit a Beacon (step D2).

The node N3 which has received the Beacon frame transmits the CSA element included in the Beacon frame to the adjacent nodes through a Beacon frame when it is able to transmit a Beacon (step D3). Since a Beacon is autonomously, decentrally transmitted, a time is taken. According to requirements, when radar is detected, a channel is released within a Channel Move Time (=10 s), but under a multihop circumstance, due to requirements of Channel Move Time (=10 s) and Channel Closing Transmission Time (=260 ms), a reaching range of a Beacon frame is restricted. That is, since a reaching range of a CSA element is restricted, there occurs a case where all nodes N1 to N6 cannot change to the same channel within a Channel Move Time (=10 s).

If in a state that a Beacon frame reaches the node N4 (step D4), a Channel Move Time (=10 s) lapses and a channel is changed, a communication between the node N4 and the node N5 is disconnected (step D5).

Therefore, in order to realize the DFS function specified in the ITU-R recommendation M.1652 described above, under a multihop circumstance, it is necessary to expand a reaching range of the CSA element when radar is detected.

Figure 14:
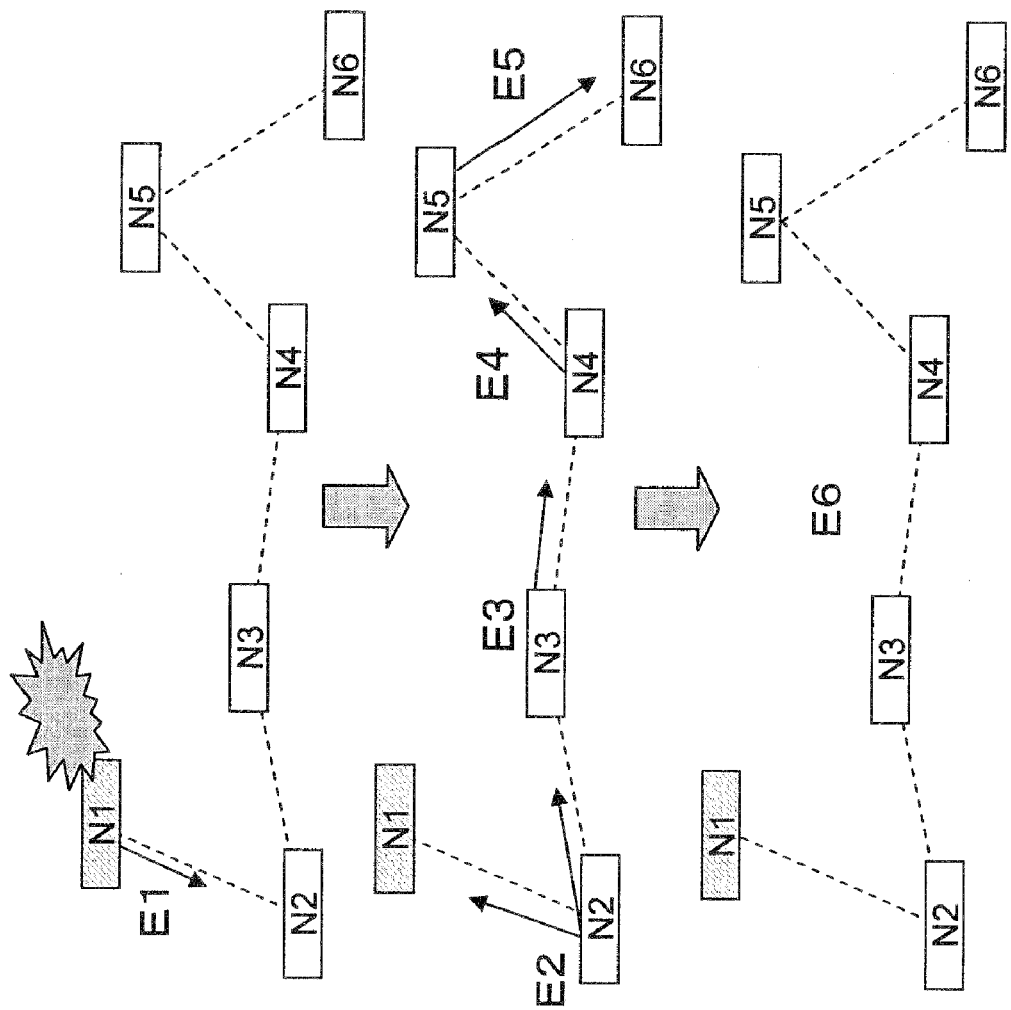
FIG. 14 is a view illustrating a resolution approach of a problem that a communication is disconnected under a multihop circumstance.

For this reason, in the present embodiment, an approach shown in FIG. 14 is applied to resolve the above-mentioned problem. The approach will be described below with reference to FIG. 14.
(Resolution Approach)

First, when the DFS Owner node N1 detects radar, the DFS Owner node N1 transmits (broadcasts) a CSA frame to the adjacent node N2 at least one time (step E1).

The node N2 which has received the CSA frame transmits a CSA element included in the CSA frame to the adjacent nodes through a CSA frame (step E2). The each node N3, N4 and N5 which has received the CSA frame transmit the CSA element included in the CSA frame to the adjacent nodes through a CSA frame (steps E3 to E5). Since a CSA frame is not autonomously, decentrally transmitted unlike a Beacon, it is possible to transmit a CSA frame up to the node N6. Accordingly, the each node N1 to N6 can change a channel within a Channel Move Time (=10 s) (step E6).

As described above, in the present embodiment, a node which has received a CSA frame transmits a CSA element included in the CSA frame to the adjacent nodes through a CSA frame, whereby it is possible to expand a reaching range of a CSA element when radar is detected. As a result, the each node N1 to N6 can change a channel within a Channel Move Time (=10 s), thereby realizing the DFS function specified in the ITU-R recommendation M.1652 described above, under a multihop circumstance.

Unicasting, multicasting, and broadcasting etc., can be used as a transmission method for transmitting a CSA frame. If a CSA frame is transmitted by unicasting or multicasting, the existing routing function is used. If it is transmitted by broadcasting, flooding is preferably used.

In the present embodiment described above, each node which has received a CSA frame transmits a CSA element included in the CSA frame to the adjacent nodes through a CSA frame. However, it is possible to construct for transmitting using a Beacon frame jointly. In this instance, like the present embodiment described above, it is possible to construct for transmitting a transmission interval (Beacon interval) of a Beacon frame is shortened.

(Problem: Dismissal of a DFS Owner is Delayed)

Figure 15:
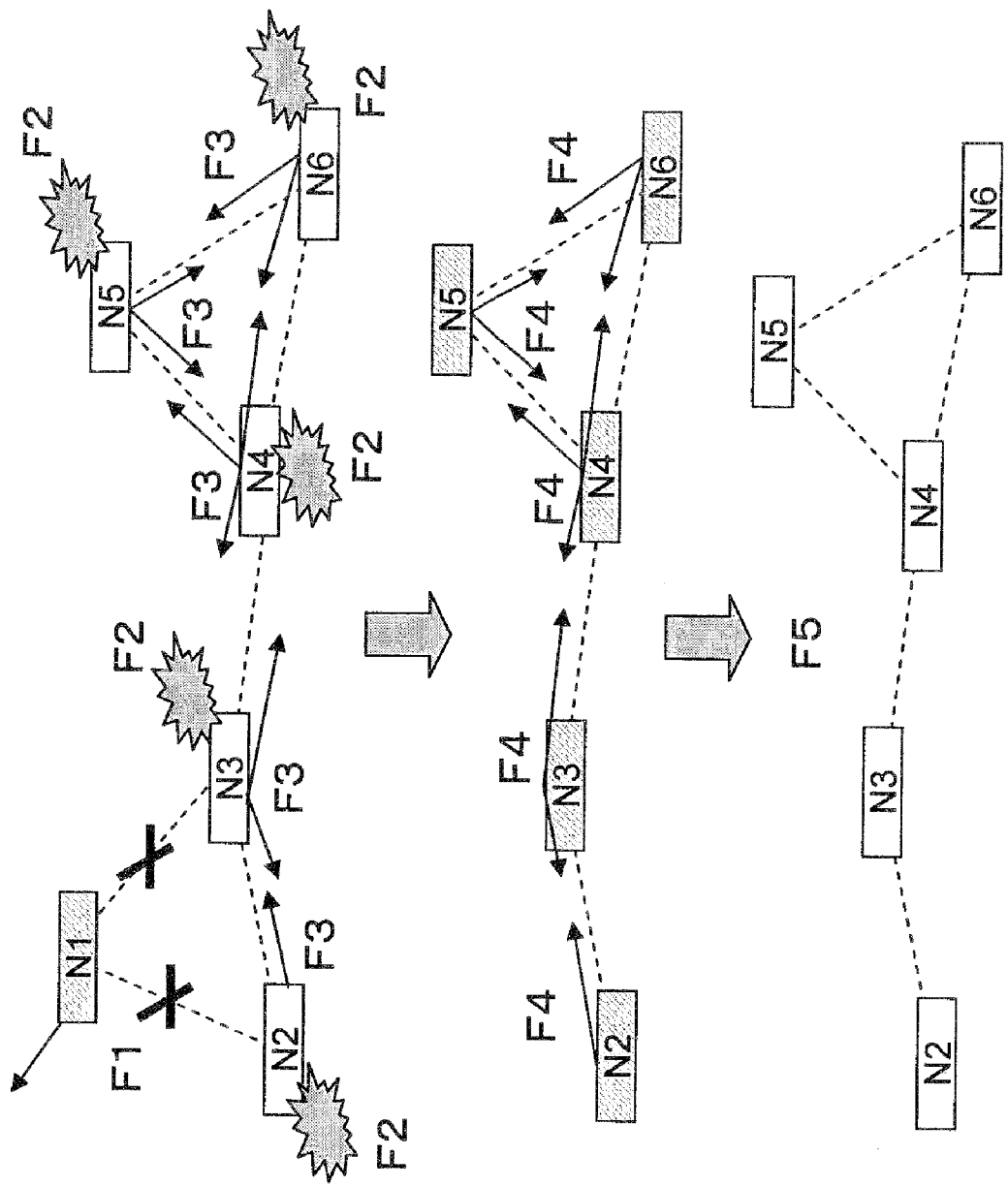
FIG. 15 is a view illustrating a problem in that dismissal of a DFS Owner is delayed.

Next, a problem: that dismissal of a DFS Owner is delayed will be with reference to FIG. 15.

First, the DFS Owner node N1 escapes from the IBSS (step F1).

Next, it is assumed that the each node N2 to N6 detects radar (step F2). In this instance, each node N2 to N6 transmits an MR frame to the adjacent nodes (step F3). In this instance, since there is no response to the MR frame, each node N2 to N6 enter: a DFS Owner Recovery mode to assume the role of DFS Owner. The DFS Owner nodes N2 to N6 transmit a CSA frame to the adjacent nodes (step F4). Each DFS Owner node N2 to N6 which have received the CSA frame escape from the DFS Recovery mode, and adopt the CSA and switch a channel (step F5).

However, when each DFS Owner node N2 to N6 transmits the CSA frame, there is a possibility that a frame collision occurs If the CSA frames are simultaneously transmitted and all CSA frames collide with each other, each DFS Owner node N2 to N6 cannot receive the CSA frame and so maintain the DFS Owner. Also, if some of the CSA frames collide with each other, some of the nodes maintain the DFS Owner. Then, the DFS Owner nodes N2 to N6 receive the Beacon frame from the adjacent nodes and are controlled to quit the role of DFS Owner and to become the DFS Client by the DFS element included in the received Beacon frame. As a result, the DFS Owner is dismissed. However, since the TSF Timer values of each node N2 to N6 are already synchronized, it is hardly dismissed. If a Time Stamp included in a Beacon frame has a delayed value compared to its own TSF timer value, information (DFS Owner and DFS Recovery Interval) of the IBSS DFS element included in the Beacon frame is adopted, and thus it is controlled to quit the role of DFS Owner and become the DFS Client. However, if the TSF timer values of each node N2 to N6 are synchronized, information of the DFS element is not adopted, and so it is not controlled to quit the role of DFS Owner and become the DFS Client.

Figure 16:
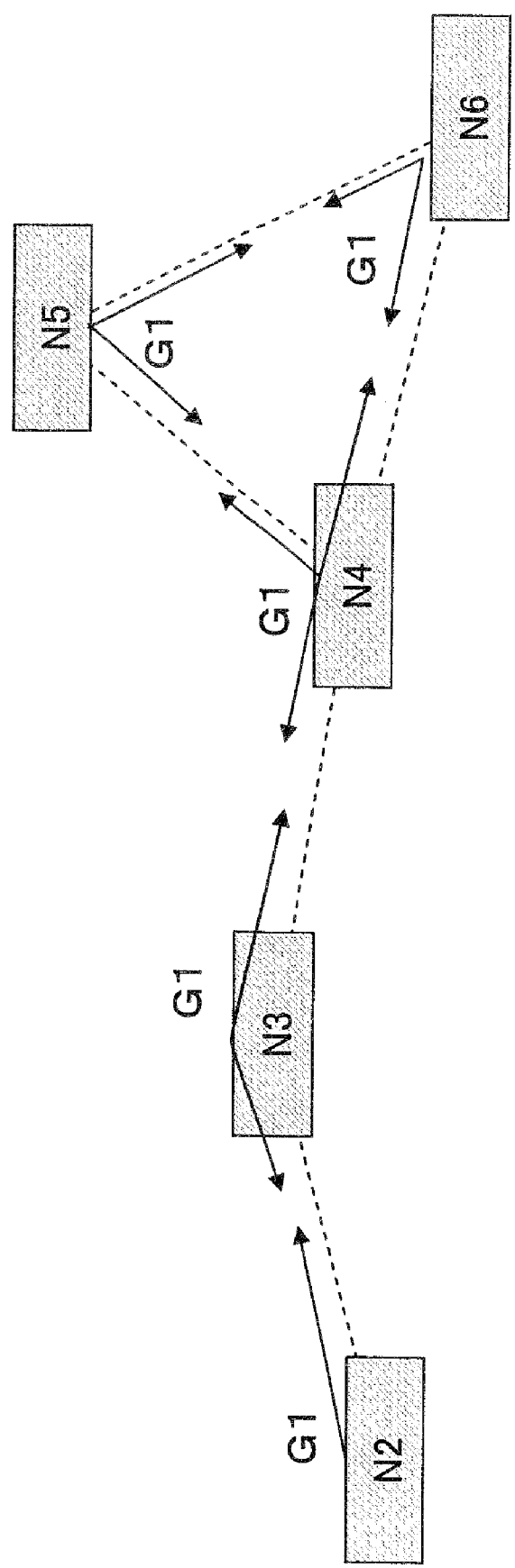
FIG. 16 is a view illustrating a resolution approach of a problem in that dismissal of a DFS Owner is delayed.

For this reason, in the present embodiment, an approach below is applied to resolve the above-mentioned problem. The approach will be described below with reference to FIGS. 16 and 17.

(Resolution Approach)

Figure 17:
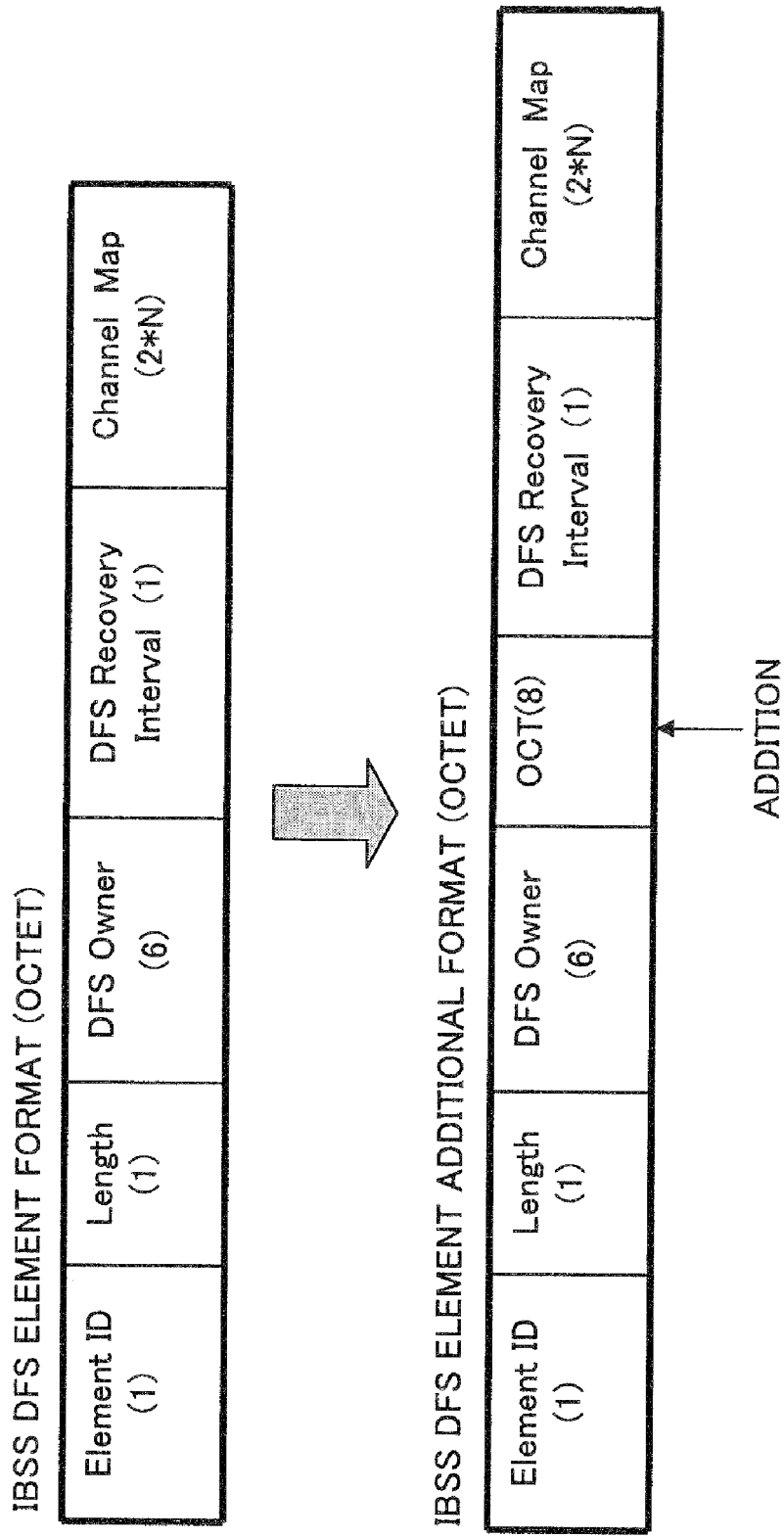
FIG. 17 is a view illustrating an example of a configuration of an IBSS DFS element when a resolution approach of a problem in that dismissal of a DFS Owner is delayed is applied.

First, if each node N2 to N6 enters the DFS Owner or enter the DFS Owner Recovery mode to assume the role of DFS Owner, TSF timer values (Owner Create Time (OCT)) at the moment that they enter the DFS Owner or assume the role of DFS Owner are stored in a memory. The DFS Owner nodes N2 to N6 which becomes the DFS Owner or assume the role of DFS Owner transmits the OCT together with information of the DFS Owner to an adjacent node through a Beacon frame (step G1). "OCT" is included in the IBSS DFS element and is transmitted through a Beacon frame as shown in FIG. 17.

Next, the DFS Owner nodes N2 to N6 which have received the Beacon frame from other nodes refer to the DFS Owner included in the IBSS DFS element of the received Beacon frame to confirm whether or not an MAC address included in the DFS Owner is different from their own MAC addresses. If an MAC address included in the DFS Owner is different from their own MAC addresses, the DFS Owner nodes N2 to N6 compare the OCT (received OCT) included in the IBSS DFS element to their own OCTs (own OCT). If the OCT (received OCT) included in the IBSS DFS element progresses more than their own OCTs (own OCT) (received OCT<own OCT), the DFS Owner node is controlled to quit the role of DFS Owner and become the DFS Client.

If the received OCT does not progress more than the own OCT (received OCT≧own OCT), the DFS Owner node maintains the role of DFS Owner and finishes processing.

Also, if an MAC address included in the DSF Owner field is identical to its own MAC address, the DFS Owner node finishes processing.

As described above, in the present embodiment, when each node becomes a DFS Owner or enters a DFS Owner Recovery mode to assume the role of DFS Owner, a resumption time (OCT) that it becomes a DFS Owner or assumes the role of DFS Owner is stored. The DFS Owner node notifies DFS Owner information and OCT information to the adjacent nodes through a Beacon frame. The DFS Owner node compares DFS Owner information included in a Beacon frame received from other nodes to its own DFS Owner information. If both DFS Owner information is different, the OCT (received OCT) included in the Beacon frame is compared to its own OCT (own OCT). If the received OCT is more progresses than its own OCT, the DFS Owner node is controlled to quit the role of DFS Owner and become the DFS Client.

As a result, even though in a state a plurality of DFS Owners or the role of DFS Owner which is assumed exists, it is possible to control to quit the role of the DFS Client according to a resumption time that it becomes the DFS Owner or assumes the role of DFS Owner and enter the DFS Client, whereby the DFS Owner can be rapidly dismissed.

Also, in the embodiment, if an OCT (received OCT) included in a Beacon frame more progresses than its own OCT (own OCT) (received OCT<own OCT), the DFS Owner node is controlled to quit the role of DFS Owner and become the DFS Client, whereas if an received OCT does not progress more than its own OCT (received OCT≧own OCT), the DFS Owner maintains the role of DFS Owner and finishes processing. But it is possible to perform above processing using a reversed determination method. That is, if an OCT (received OCT) included in a Beacon frame is more delayed than its own OCT (own OCT) (received OCT>own OCT), the DFS Owner node is controlled to quit the role of DFS Owner and become the DFS Client, whereby if an received OCT is not delayed more than its own OCT (received OCT≦own OCT), the DFS Owner node maintains the role of DFS Owner and finishes processing.

Preferably, since a node which first becomes the DFS Owner usually has a priority, if an OCT (received OCT) included in a Beacon frame progresses more than its own OCT (own OCT) (received OCT<own OCT), the DFS Owner node is controlled to quit the role of DFS Owner and become the DFS Client, whereas if an received OCT does not progress more than its own OCT (received OCT≧own OCT), the DFS Owner node maintains the role of DFS Owner and finishes processing.

Also, in the present embodiment, a TSF tinier value is used, but each node can mount a timer count function and a timer value counted by a timer count function can be used as an OCT.

Also, in the present embodiment, it is confirmed whether or not an MAC address included in the DSF Owner is different from its own MAC address, but any unique identification information which can be used to discriminate each node like an MAC address can be applied.

(Problem: a Plurality of Instructions are Generated)

Figure 18:
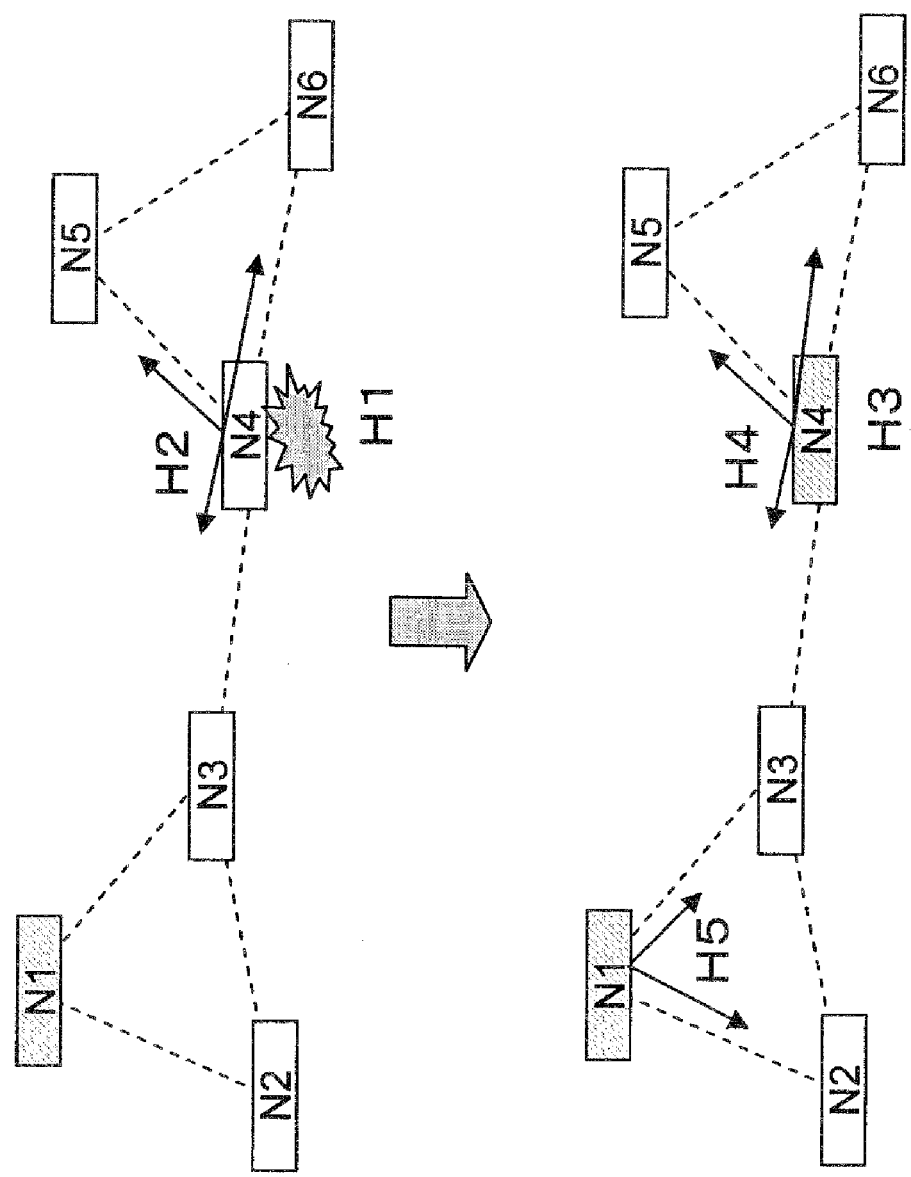
FIG. 18 is a view illustrating a problem in that a plurality of instruction contents are generated.

Next, a problem that a plurality of instructions are generated will be described with reference to FIG. 18.

First, when the node N4 detects radar (step H1), the node N4 transmits (unicasts or broadcasts) an MR frame to the adjacent nodes N3, N5 and N6 at least one time (step H2).

In this instance, since the node N4 cannot receive a CSA even though a DFS Owner Recovery Interval has lapsed, the node N4 enters a DFS Owner Recovery mode to assume the role of DFS Owner (step H3).

(Method for Solving the Problem)

When the node N4 becomes the DFS Owner, the node N4 transmits (broadcasts) a CSA frame to the adjacent nodes N3, N5 and N6 at least one time (step H4).

At this time, when the node N1 also detect radar, the node N1 transmits a CSA frame to the adjacent nodes N2 and N3 at least one time (step H5). In this instance, the node N3 receives the CSA frames from both of the node N4 and the node N1. If CSA frames have same contents as the node N4 and N1, it is not problematic to adopt them, but if they are different, there occurs a problem that the node N3 cannot determine which one of contents of the CSA frames received from the node N4 and the node N1 is adopted.

Figure 19:
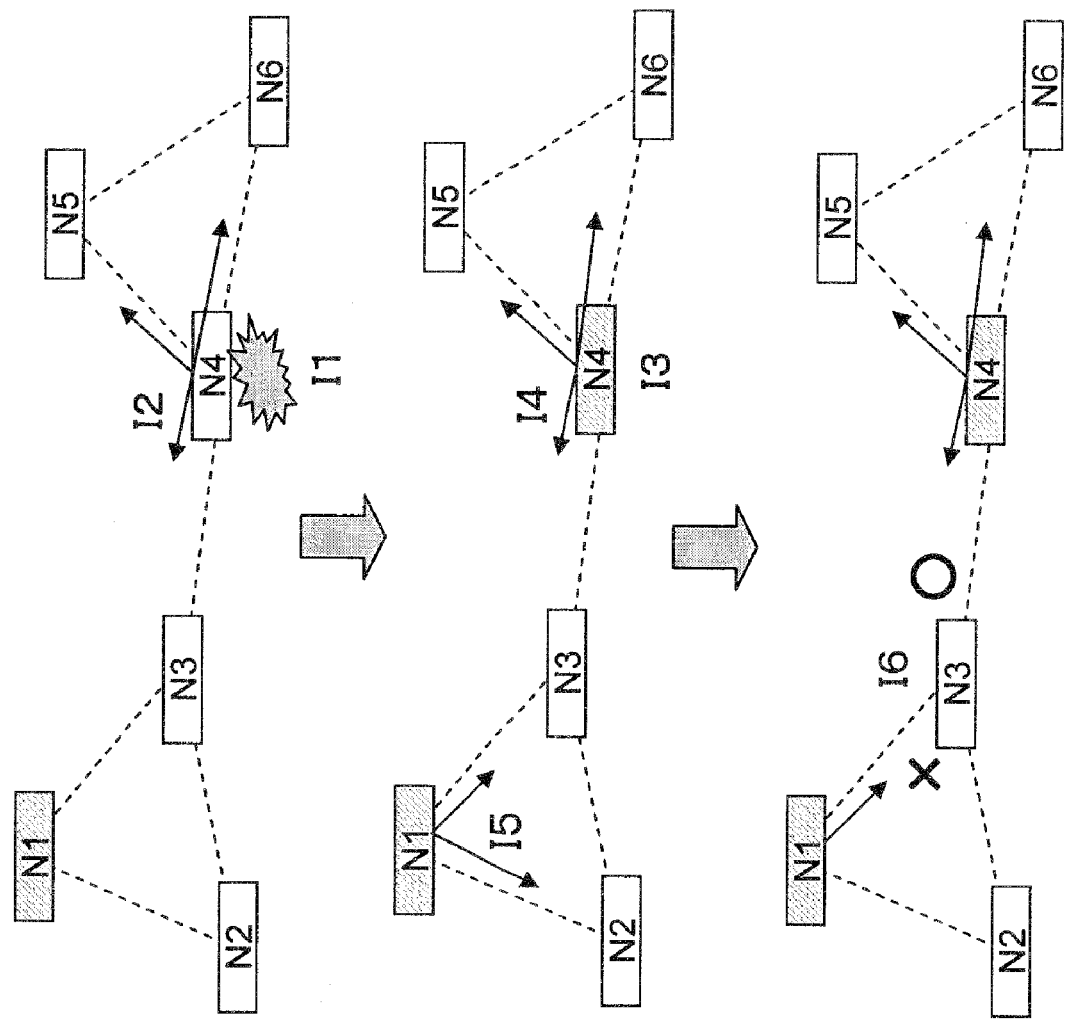
FIG. 19 is a view illustrating a resolution approach of a problem in that a plurality of instructions are generated.

For this reason, in the present embodiment, an approach shown in FIG. 19 is applied to resolve the above-mentioned problem. The solution will be described with reference to FIG. 19.

First, when the node N4 detects radar (step I1), the node N4 transmits (unicasts or broadcasts) an MR frame to the adjacent nodes N3, N5 and N6 at least one time (step I2).

In this instance, since the node N4 cannot receive a CSA even though a DFS Owner Recovery Interval has lapsed, the node N4 enters a DFS Owner Recovery mode to assume the role of DFS Owner (step I3).

When the node N4 becomes the DFS Owner, the node N4 transmits (broadcasts) a CSA frame to the adjacent nodes N3, N5 and N6 at least one time (step I4).

At this time, in case where the node N1 also detects radar, the node N1 transmits a CSA frame to the adjacent nodes N2 and N3 at least one time (step I5). In this instance, the node N3 receives the CSA frames from both of the node N4 and the node N1.

In the present embodiment, the node N3 is controlled to compare transmitting addresses included in the CSA frames and to adopt the CSA frame that the transmitting address is smaller (or larger) (step I6). FIG. 19 shows that the CSA frame of the node N4 is adopted. Therefore, even though both CSA frames of the node N4 and the node N1 are different, it can adopt either one of the CSA frame according to the transmitting address included in the CSA frame. It can be set in the node N3 in advance whether or not to adopt the CSA frame with a smaller transmitting address or the CSA frame with a larger transmitting address.

In the present embodiment, based on the transmitting address included in the CSA frame, it is determined which CSA frame is adopted. However, identification information (for example, individual number of a housing) set unique to each node can be included in a CSA frame, and it can be constructed that it can be determined which CSA frame is adopted based on unique identification information included in the CSA frame. Since an MAC address is already included in the CSA frame, the MAC address included in the CSA frame can be used.

Also, when radar is detected, a channel list which is an index for a channel switch can be shared by each node N1 to N6 so that contents of the CSA frames will not be different between each node N1 to N6. As a result, even though the node N3 receives the CSA frames from both the node N4 and the node N1, since contents of both CSA frames are the same, a problem does not occur by adopt the content of CSA frame. The list can be shared by the nodes such that a list created by a user is notified to each node or is set in each node. Also, the list can be shared by the nodes such that each node autonomously creates a list and notifies the created list. Hereinafter, a list creating method will be described.

<List Creating Method>

First, a node performs channel scan processing to measure a radio channel state around a node. This makes it possible for a node to measure a received signal level on each radio channel. Then, a node creates channel scan information of each channel based on the received signal level measured by above processing.

In the present embodiment, channel scan information $S_m$ of a radio channel m is computed by Equation 1 using a received signal level prediction function $f(x)$.

[Equation 1]

$$S_m = \sum_{n=1}^{N} R_n \times f(m\_c_n)(m = 1, 2, \ldots M) \qquad \text{(Equation 1)}$$

Here, N denotes the total number of received signal levels, $R_n$ denotes a value of a received signal level, $f(x)$ denotes a received signal level prediction function, m denotes a range of a radio channel, and $C_n$ denotes a radio channel number.

Figure 20:
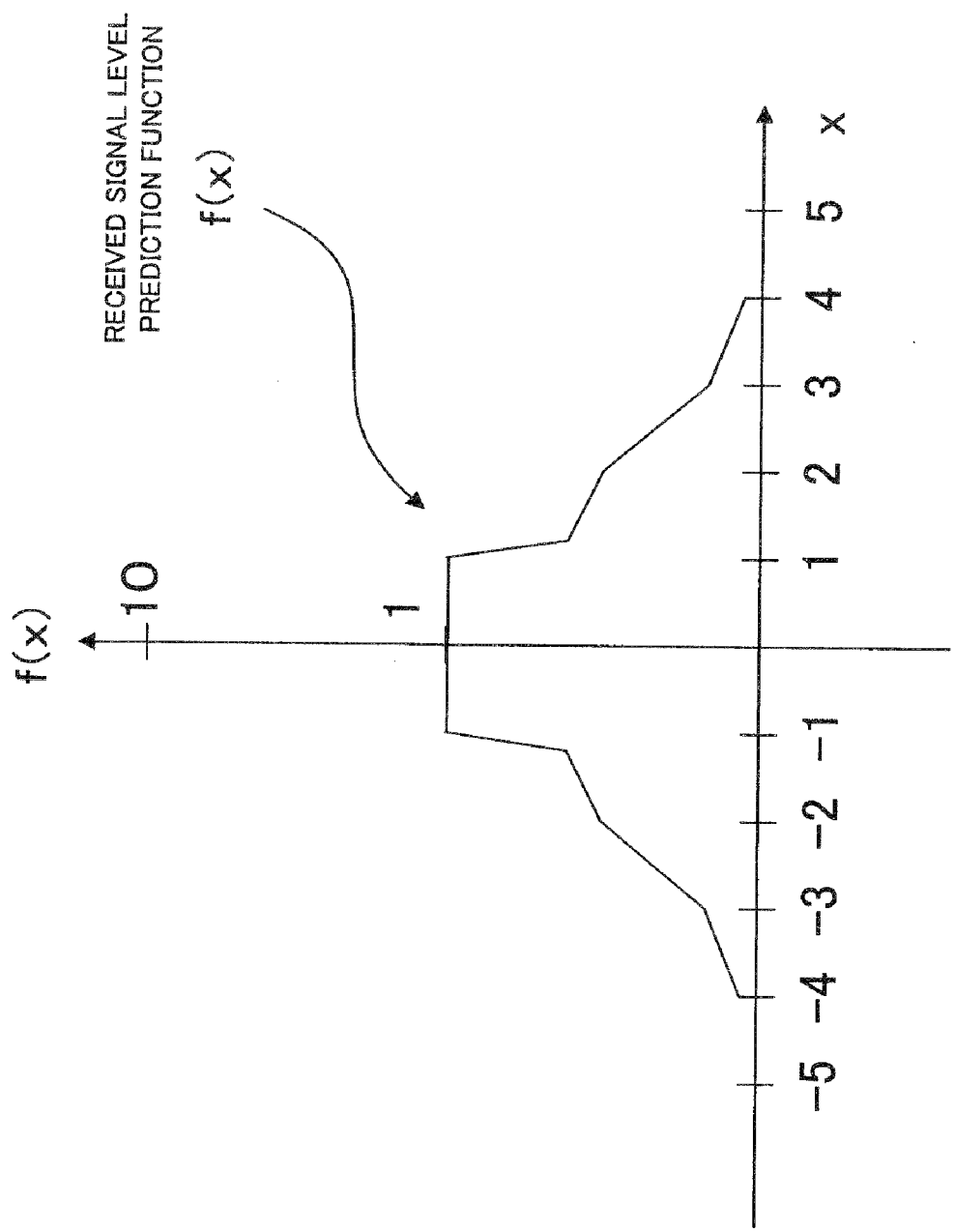
FIG. 20 is a view illustrating a received signal level prediction function f(x)

The received signal level prediction function $f(x)$ is, for example, a quadratic function shown in FIG. 20 and can apply a function obtained from a spread spectrum of a frequency arrangement and a function which considers a loss ratio of a radio wave. Needless to say, since a maximum range of a radio channel number M differs according to a wireless method or a country, a range of a radio channel m can be optionally set or changed.

The received signal level prediction function $f(x)$ assumes a radio wave transmission spectrum, and so it becomes a function which has x=0 being a central frequency as a maximum value as shown in FIG. 20.

Actually, however, interpretation processing which will be described later is performed from a radio single sequence received by a node to compute the power spectrum density $P(f)$, and a function $f(x)$ which becomes a peak value of the computed power spectrum density $P(f)$ becomes the received signal level prediction function $f(x)$.

Through interpretation processing, the power spectrum density $P(f)$ can be computed by directly Fourier transforming a radio signal sequence received by a node. For example, if the power spectrum density of a certain time wave form $x(t)$ is $P(f)$, Equation 2 below is formed by assigning power Pt to a frequency component of a certain minute section (f, f+df).

[Equation 2]

$$Pt \equiv \frac{1}{|t_2 - t_1|} \int_0^\infty |x(t)|^2 \, dt = \int_0^\infty P(f) df \quad \text{(Equation 2)}$$

Here, t2 and t1 denote a random time, and P(f) is defined by Equation 3 below.

[Equation 3]

$$P(f) \equiv \lim_{|t_2 - t_1| \to \infty} \frac{1}{|t_2 - t_1|} \left| \int_{t_1}^{t_2} x(t) \exp(-j2\pi ft \, dt) \right|^2, f \geq 0 \quad \text{(Equation 3)}$$

Since it is difficult to perform above-mentioned interpretation processing using only the existing information, it is preferable to compute a pseudo function f(x) from a typical spectrum.

Equation 4 below is preferably applied as a pseudo function f(x) which represents the above-described spectrum.

[Equation 4]

$$f(x) = \frac{\sin(\pi \times x)}{\pi \times x}, x \neq 0 \quad \text{(Equation 4)}$$
$$f(x) = 1, x = 0$$

Also, in case of a radio standard 11g, Equation 5 below is preferably applied as a pseudo function f(x) which represents the above-described spectrum mask. In this instance, processing can be more simplified than when a function f(x) defined by Equation 4 is applied. Also, in case of a radio standard 11g, it is preferable to apply Equation 5.1 below.

[Equation 5]

$$f(x) = 0 (x < -4, 4 < x)$$

$$f(x) = 0.19 (x = -4, 4)$$

$$f(x) = 0.45 (x = -3, 3)$$

$$f(x) = 0.52 (x = -2, 2)$$

$$f(x) = 0.9 (x = -1, 1)$$

$$f(x) = 1 (x = 0) \quad \text{(Equation 5)}$$

$$f(x) = 0 (x < -4, 4 < x)$$

$$f(x) = 0.1 (x = -4, 4)$$

$$f(x) = 0.9 (x = -2, -3, 2, 3)$$

$$f(x) = 1 (x = -1, 0, 1) \quad \text{(Equation 5.1)}$$

Figure 21:
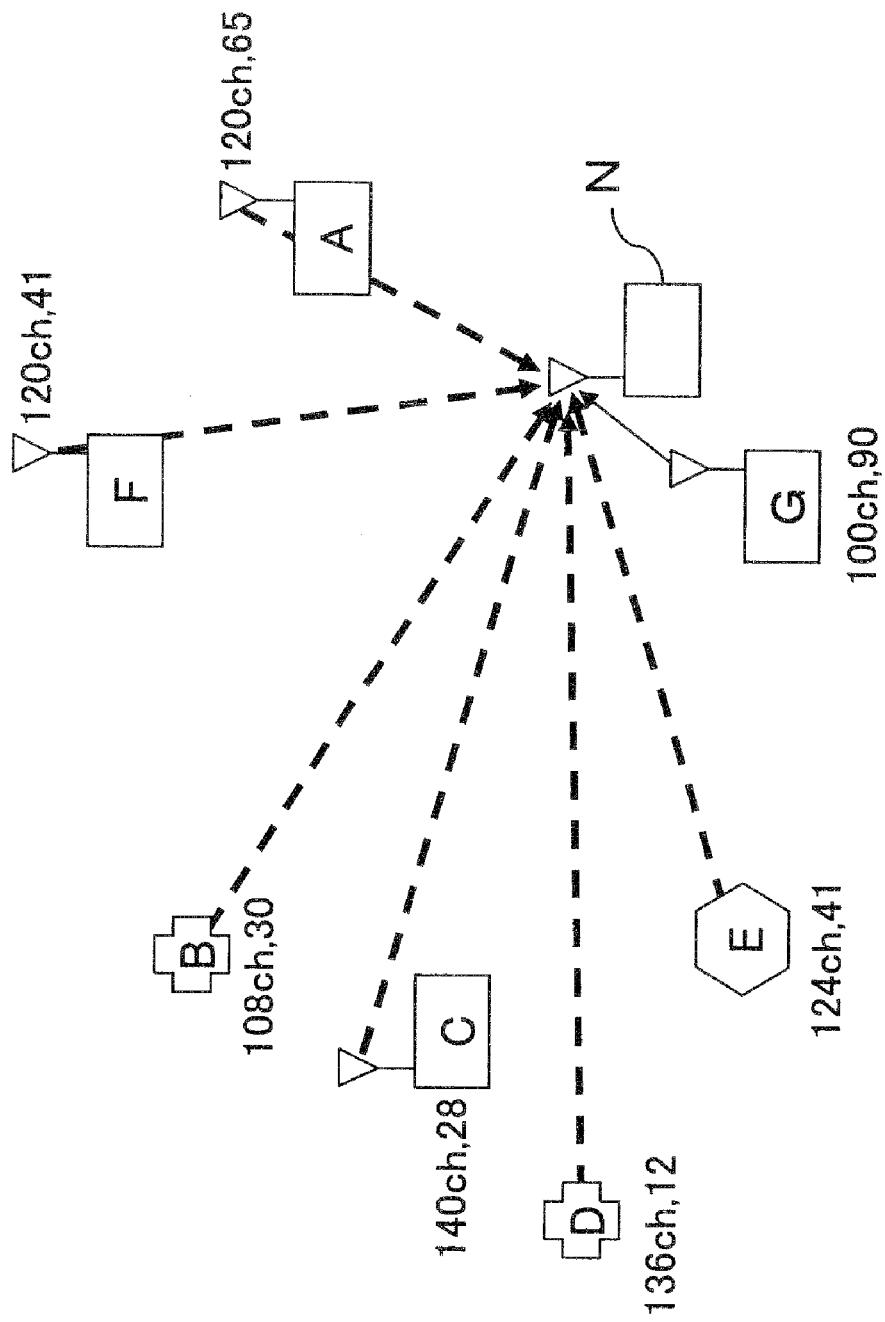
FIG. 21 is a view illustrating examples of wireless apparatuses which exist around a node as a radio signal source.

It is assumed that a wireless apparatus as a radio signal generating source exists around a node as shown in FIG. 21. The node performs channel scan processing under a circumstance shown in FIG. 21 to measure a radio channel state of each radio channel around the node, whereby a measurement result shown in FIG. 22 is obtained.

Figure 22:
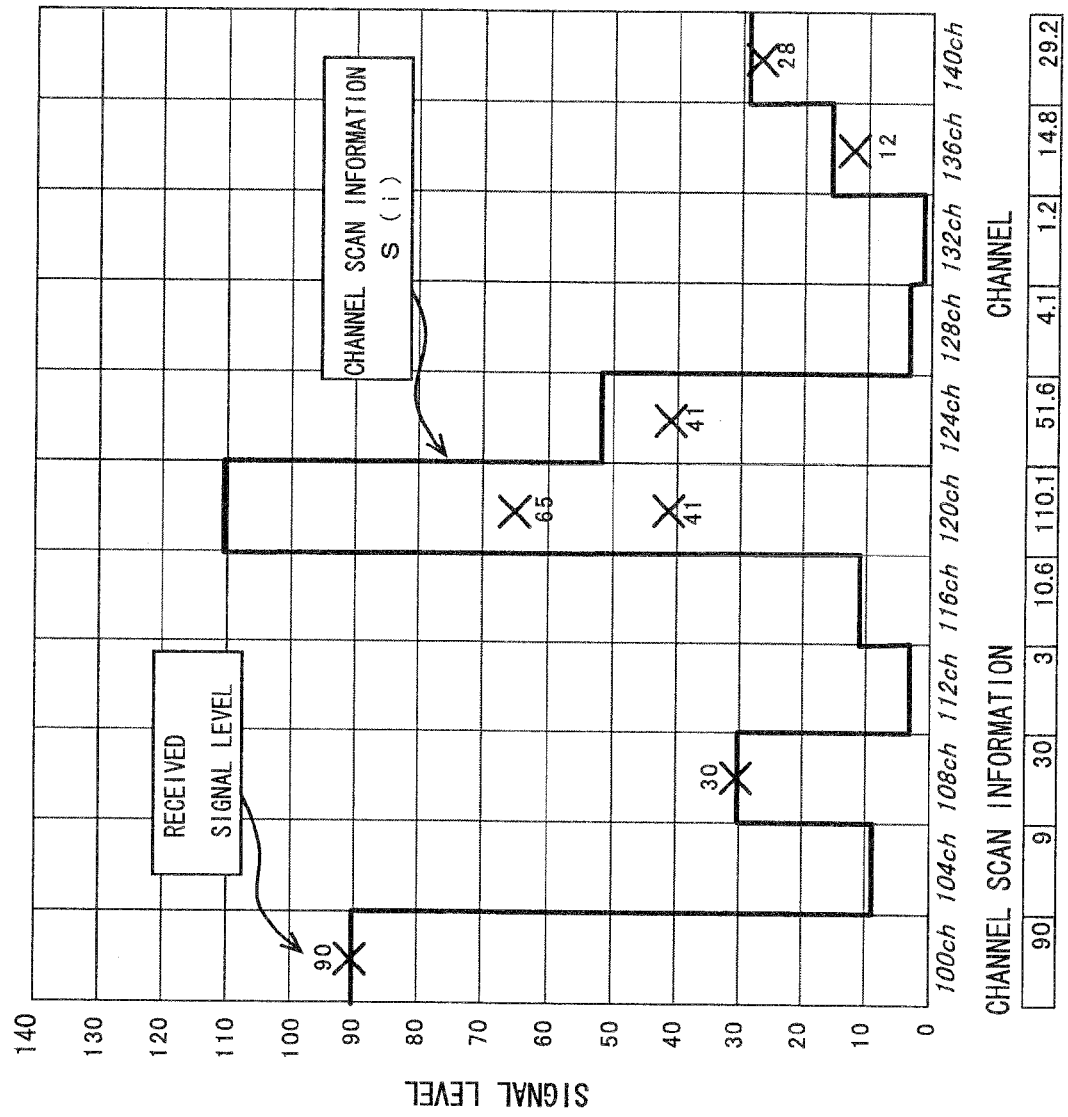
FIG. 22 is a view illustrating a measurement result when a wireless channel state around a node is measured for each wireless channel by a node performing channel scan processing under a circumstance condition shown in FIG. 21.

The measurement result shown in FIG. 22 is obtained such that the node performs channel scan processing and measures a received signal level of each of radio channels x=100 to 140. In FIG. 22, "x" denotes a measurement result of the received signal level.

In FIG. 22, a radio apparatus G which uses a radio channel 100 ch exists, and its received signal level is 90. Similarly, a radio apparatus B which uses a radio channel 108 ch exists, and its received signal level is 30. Also, a radio apparatus F which uses a radio channel 120 ch exists, and its received signal level is 41. A radio apparatus A which uses a radio channel 120 ch exists, and its received signal level is 65. A radio apparatus E which uses a radio channel 124 ch exists, and its received signal level is 41. A radio apparatus D which uses a radio channel 136 ch exists, and its received signal level is 12. A radio apparatus C which uses a radio channel 140 ch exists, and its received signal level is 28.

The received signal level described above can be measured by applying known channel scan method. For example, the received signal level can be measured by a scan method disclosed in ISO/IEC 8802-11 IEEE Std 802.11 Second edition 2005-08-01 ISO/IEC 8802 11:2005(E) IEEE Std 802.11i-2003 Edition, Information technology—Telecommunications and information exchange between systems—Local and metropolitan area networks—Specific requirements Part 11: Wireless LAN Medium Access Control (MAC) and Physical Layer (PHY) specifications (Includes IEEE Std 802.11, 1999 Edition; IEEE Std 802.11a.-1999; IEEE Std 802.11b.-1999; IEEE Std 802.11b.-1999/Cor 1-2001; and IEEE Std 802.11d.-2001), and active scan or passive scan can be applied. Active scan is a method for searching for a network by exchanging Probe Request/Response frames. Also, passive scan is a method for searching for a network by monitoring a beacon.

In FIG. 22, channel scan information Si represented by "a solid line" represents a computation result of the received signal level prediction function f(x) using Equation 5 described above, for example, represents that channel interference occurs up to 104 ch when 100 ch is used. That is, it represents that an interference area according to the received signal level 90 of a radio channel 100 ch covers a range of up to 104 ch.

As described above, in the present embodiment, a node computes the received signal level prediction function f(x) based on the received signal level measured by adopting a known channel scan method and predicts an interference area that channel interference occurs for each channel. The node computes channel scan information Si based on an interference area of a radio channel predicted for each channel and creates a channel list which becomes an index for a channel switch when radar is detected based on computed channel scan information Si. Preferably, a list is created so that a channel having no interference can be by priority used as a channel to which a channel switch is performed when radar is detected. As a result, each node N1 to N6 notifies the created channel list to the adjacent nodes and share the channel list between each node, so that contents of the CSA frames in each node are not different from each other. In FIG. 22, a value of the received signal level is applied, but also a logarithmic value can be applied. The list creating method described above is a suitable approach according to the present embodiment, but a list creating method according to the present embodiment can be constructed that it is not limited to the above-described method, and the above described list can be created applying various approaches.

(Problem: Quiet Period is Asynchronized)

Figure 23:
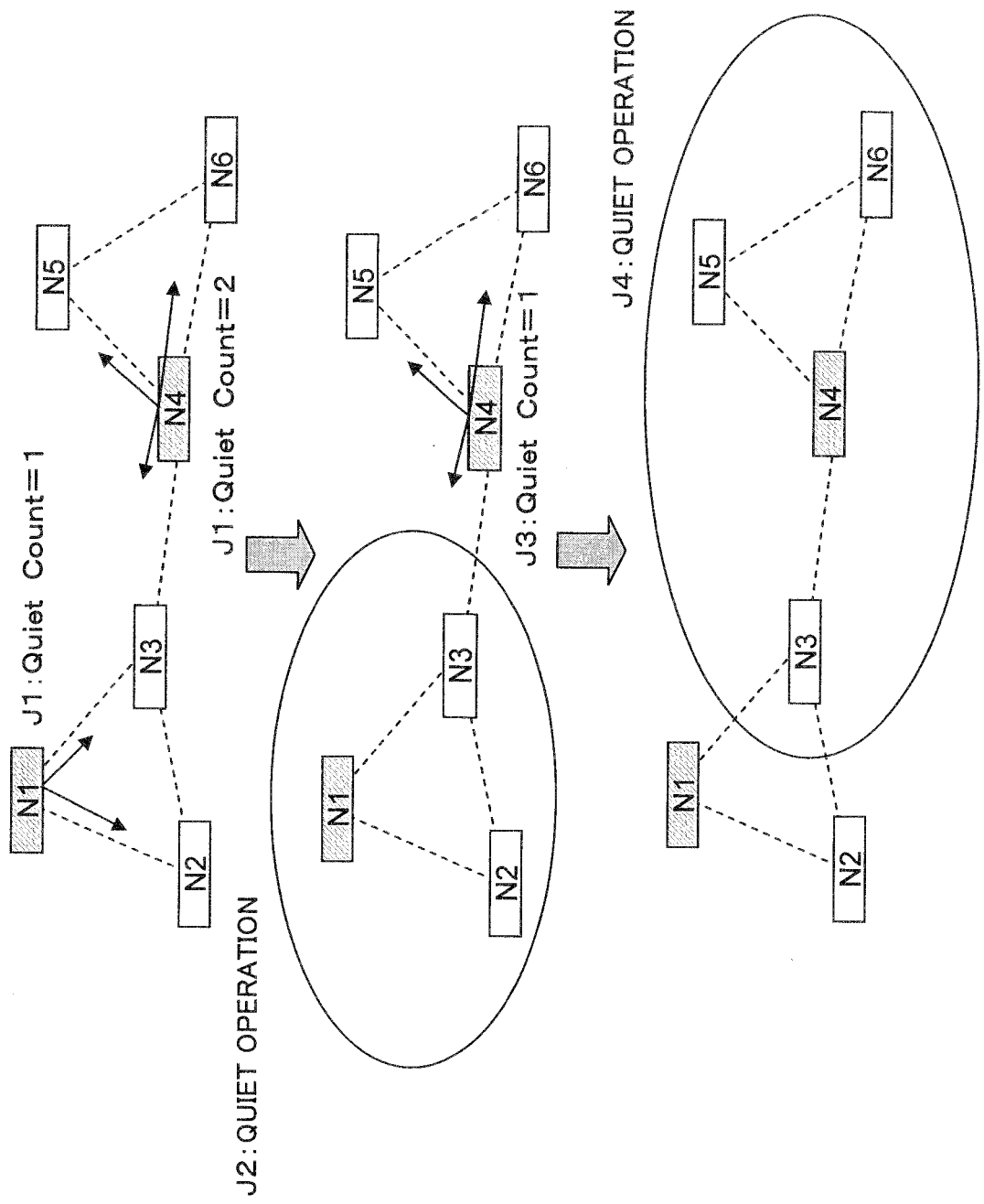
FIG. 23 is a view illustrating a problem in that a Quiet period is asynchronized.

Next, a problem in that a Quiet period is asynchronized will be described with reference to FIG. 23.

First, a plurality of DFS Owner nodes N1 and N4 include a Quiet Element in a Beacon frame or a Probe Response frame and transmits the frame to the adjacent nodes. Only the DFS Owner node can insert a Quiet Element to the frame (step J1).

By a Quiet Element instruction of the DFS Owner node N1, a Quiet Count becomes 0, and the nodes N1, N2 and N3 perform a Quiet operation (step J2).

A Quiet Count of the DFS Owner node N4 is decreased by one, so that a Quiet Count becomes 1 (step J3).

Next, by a Quiet Element instruction of the DFS Owner node N4, a Quiet Count becomes 0, and the nodes N3, N4, N5, and N6 perform a Quiet operation (step J4).

In above-described processing, the node N3 performs a Quiet operation twice. Since transmission processing cannot be performed during a Quiet operation, communication efficiency is lowered.

Figure 24:
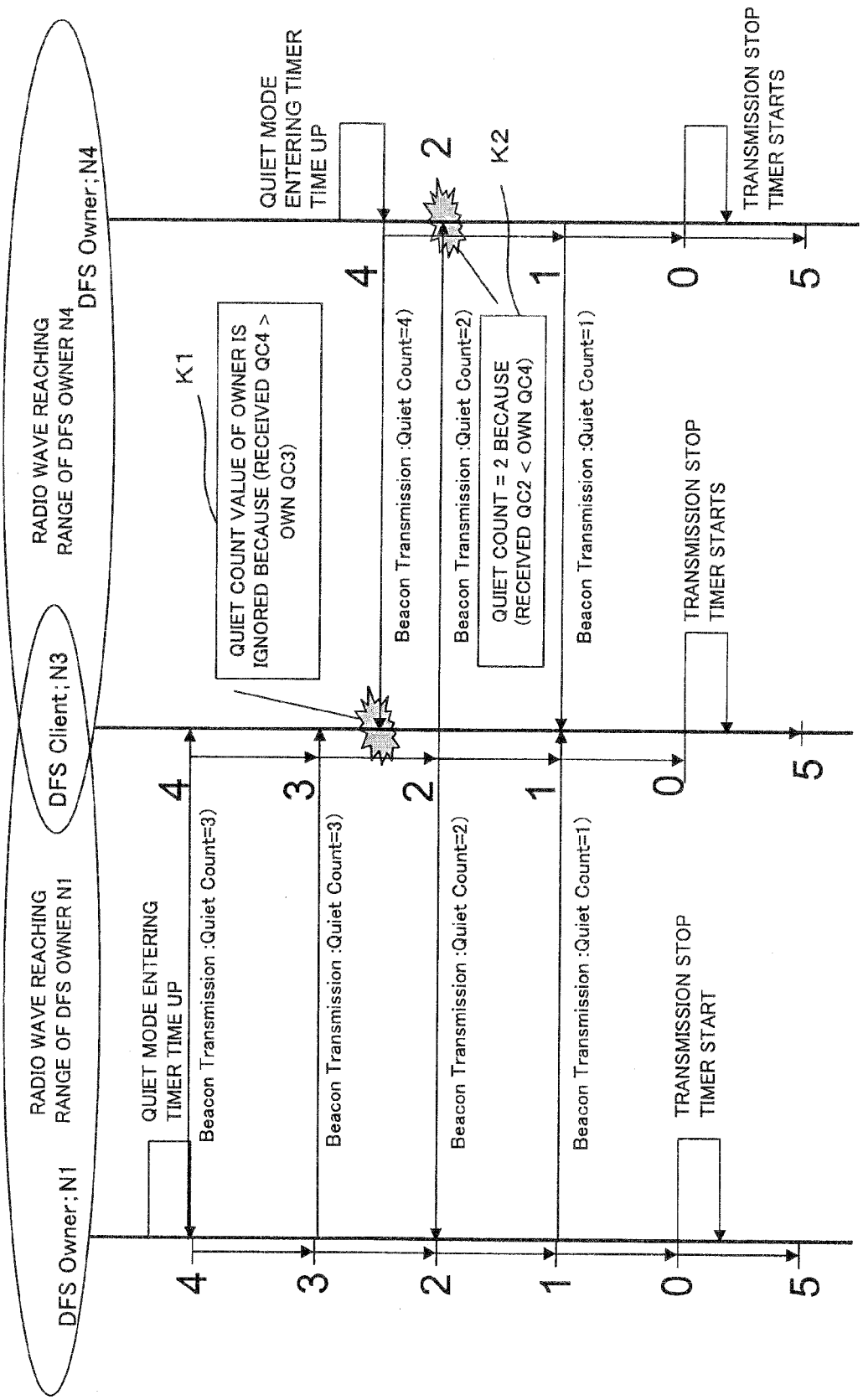
FIG. 24 is a view illustrating a resolution approach of a problem in that a Quiet period is asynchronized.

For this reason, in the present embodiment, an approach shown in FIG. 24 is applied to resolve the above-mentioned problem. The approach will be described with reference to FIG. 24.

(Resolution Approach)

First, each node compares a Quiet Count (received Quiet Count) included in a Quiet Element in a Beacon frame to its own Quiet Count (own Quiet Count). Each node changes to a value of the received Quiet Count if the received Quiet Count is smaller than its own Quiet Count (received Quiet Count<own Quiet Count). Each node does not change to a value of the received Quiet Count and ignores a value of the received Quiet Count if the received Quiet Count is not smaller than its own Quiet Count (received Quiet Count≧own Quiet Count).

For example, in FIG. 24, when a time for entering a Quiet mode has lapsed (Quiet mode entering timer time up), the DFS Owner node N1 transmits a Beacon frame including a Quiet Element of Quiet Count=4 (Beacon transmission: Quiet Count=4). The DFS Owner node N1 decreases a Quiet Count one by one and transmits a Beacon frame including a Quiet Element in which a value of the Quiet Count is included. The DFS Owner node N1 starts a transmission stop timer when a Quiet Count=0.

Then, since the DFS Client node N3 is synchronized with the DFS Owner node N1 (Quiet Count=4), the DFS Client node N3 decreases a Quiet Count one by one and transmits a Beacon frame including a Quiet Element in which a value of the Quiet Count is included. A transmission stop timer starts when a Quiet Count=0.

Similarly to the DFS Owner node N1 described above, after the DFS Owner node N4 enters a Quiet mode (Quiet mode entering timer time up), the DFS Owner node N4 transmits a Beacon frame including a Quiet Element of Quiet Count=4 (Beacon transmission: Quiet Count=4). Then, the DFS Owner node N4 decreases a Quiet Count one by one and transmits a Beacon frame including a Quiet Element in which a value of the Quiet Count is included. A transmission stop timer starts when a Quiet Count=0.

In the present embodiment, when receiving the Beacon frame including a Quiet Element of Quiet Count=4 from the DFS Owner node N4, the DFS Client node N3 compares Quiet Count=4 of the received frame to its own Quiet Count=3 to determine that Quiet Count=4 of the frame is larger than its own Quiet Count=3. In this instance, the DFS Client node N3 ignores Quiet Count=4 of the frame (step K1).

Also, when receiving a Beacon frame including a Quiet Element of Quiet Count=2 from the DFS Client node N3, the DFS Owner node N4 compares Quiet Count=2 of the received frame to its own Quiet Count=4 to determine that Quiet Count=2 of the frame is smaller than its own Quiet Count=4. In this instance, the DFS Owner node N4 changes its own Quiet Count to Quiet Count=2 based on Quiet Count=2 of the frame (step K2).

As described above, in the present embodiment, when receiving a Beacon frame, a node compares a Quiet Count included in the Beacon frame to its own Quiet Count and changes its own Quiet Count to the Quiet Count included in the Beacon frame if the Quiet Count included in the Beacon frame is smaller than its own Quiet Count. Also, if the Quiet Count included in the Beacon frame is larger than its own Quiet Count, the Beacon frame is ignored. Accordingly, a duplicated Quiet operation can be decreased.

(Problem: Collision of MR Frame and CSA Frame)

Figure 25:
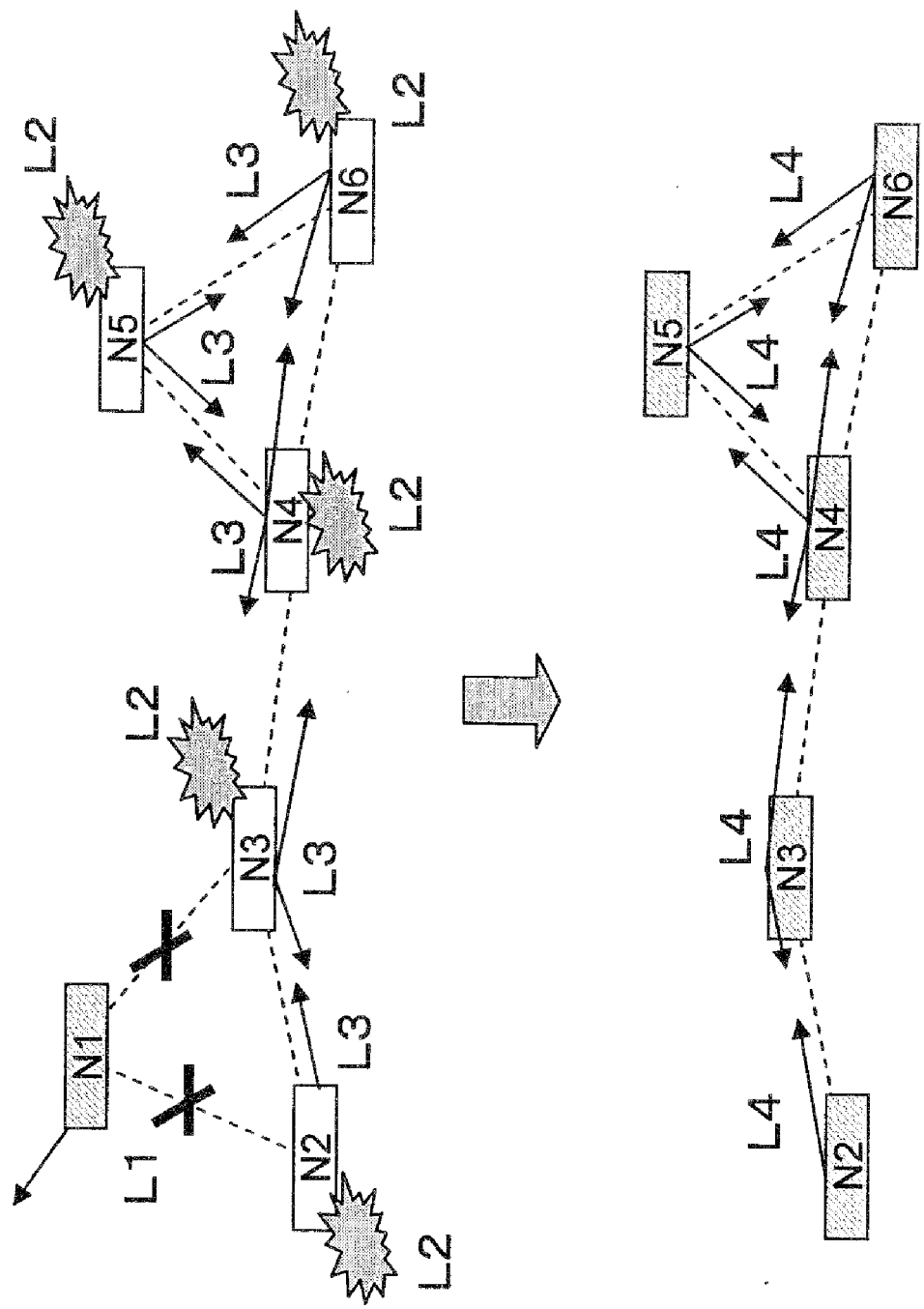
FIG. 25 is a view illustrating a problem in that a Measurement Report (MR) frame and a Channel Switch Announcement (CSA) frame collide.

Next, a problem in that an MR frame and a CSA frame collide will be described with reference to FIG. 25.

First, a DFS Owner node N1 escapes from an IBSS (step L1). It is assumed that each node N2 to N6 detects radar (step L2). In this instance, each node N2 to N6 transmits (unicasts or broadcasts) an MR frame to adjacent nodes (step L3).

If an MR frame is transmitted, there is a possibility that a frame collision occurs. Particularly, when an MR frame is transmitted in broadcast, a possibility that a frame collision occurs is increased. Therefore, unnecessary frame transmission is performed.

There is no response to an MR frame, and so the DFS Client nodes N2 to N6 enter a DFS Owner Recovery mode, so that the DFS Client nodes N2 to N6 assume the role of DFS Owner. Then, the DFS Owner nodes N2 to N6 transmit a CSA frame to adjacent nodes (step L4).

When a CSA frame is transmitted, there is a possibility that a frame collision occurs like a case of an MR frame. If all CSA frames collide, the DFS Owner nodes N2 to N6 cannot receive the CSA frame, so that a state that a plurality of DFS Owners coexist is continued. If some of CSA frames collide, a state that some of the nodes assume the role of DFS Owner is continued.

Figure 26:
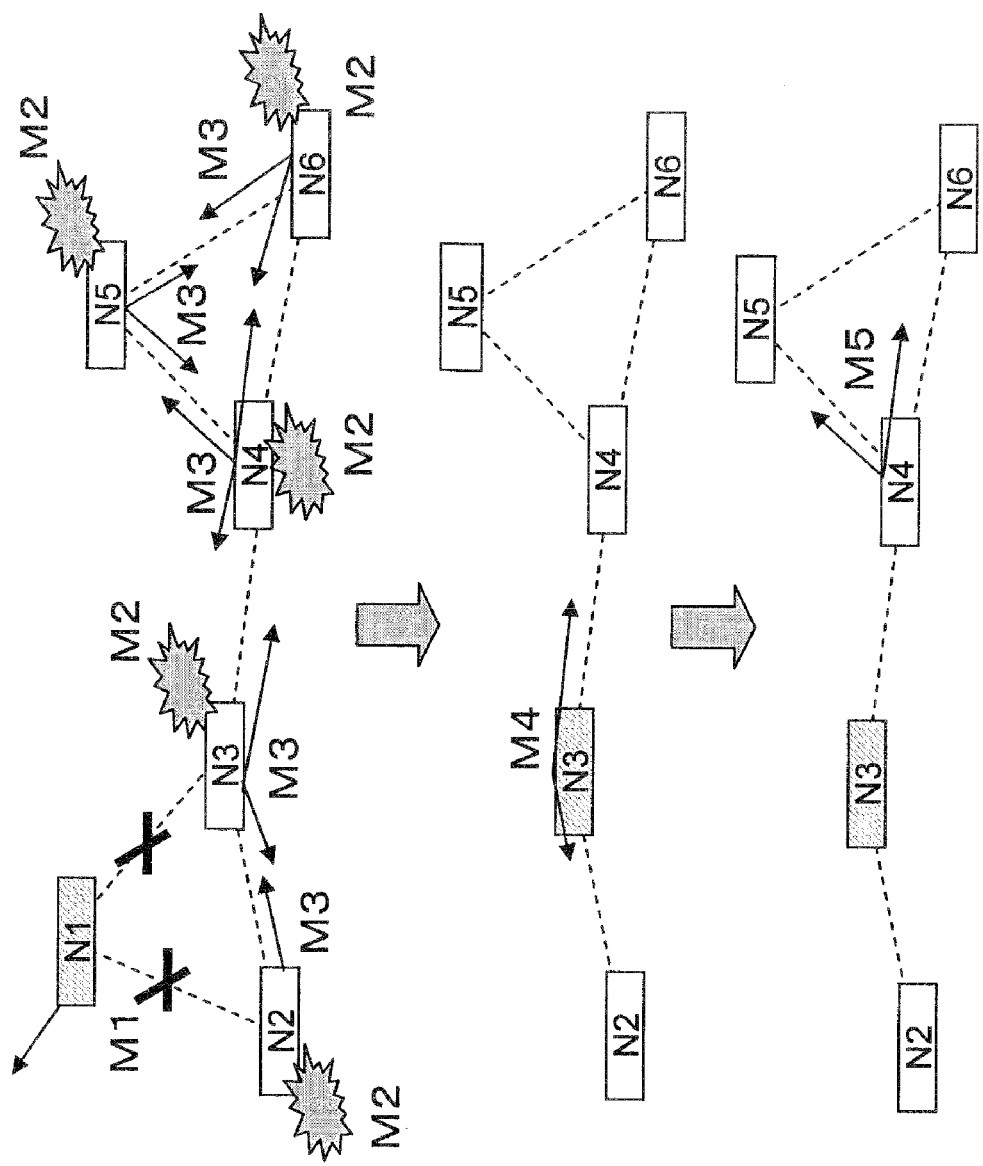
FIG. 26 is a view illustrating a resolution approach of a problem in that a MR frame and a CSA frame collide.

For this reason, an approach shown in FIG. 26 is applied to resolve the above-mentioned problem. The approach will be described below with reference to FIG. 26.

(Resolution Approach)

First, a DFS Owner node N1 escapes from an IBSS (step M1).

It is assumed that each node N2 to N6 detects radar (step M2). In this instance, each node N2 to N6 transmits (unicasts or broadcasts) an MR frame to adjacent nodes (step M3).

Here, according to the present embodiment, in step M3, each node N2 to N6 is controlled to transmit the MR frame after standby a random time. Therefore, a frame collision of the MR frames can be reduced. A method for computing a standby time is not particularly limited, and a certain computed method is applied, and a random time can be computed using various computation methods. For example, a random time can be computed based on an applied random number or an MAC address.

Next, since there is no response to the MR frame, the DFS Client nodes N2 to N6 enter the DFS Owner Recovery mode and assume the role of DFS Owner after standby a random time. The DFS Owner nodes N2 to N6 transmit (unicast, broadcast or multicast) a CSA frame to the adjacent nodes. In the present embodiment, each node N2 to N6 is controlled to transmit the CSA frame after standby a random time. Therefore, a frame collision of the CSA frames can be reduced. In the present embodiment, it is assumed that the node N3 first transmits the CSA frame (step M4).

In this instance, the node N4 receives the CSA frame and switches a channel in the same method as a sequence when the DFS Owner detects a channel (step M5).

As described above, in the present embodiment, a node transmits the MR frame or the CSA frame after standby a random time, thereby avoiding a frame collision.

(Problem: When a Node Mounts a Plurality of Wireless I/Fs)

Figure 27:
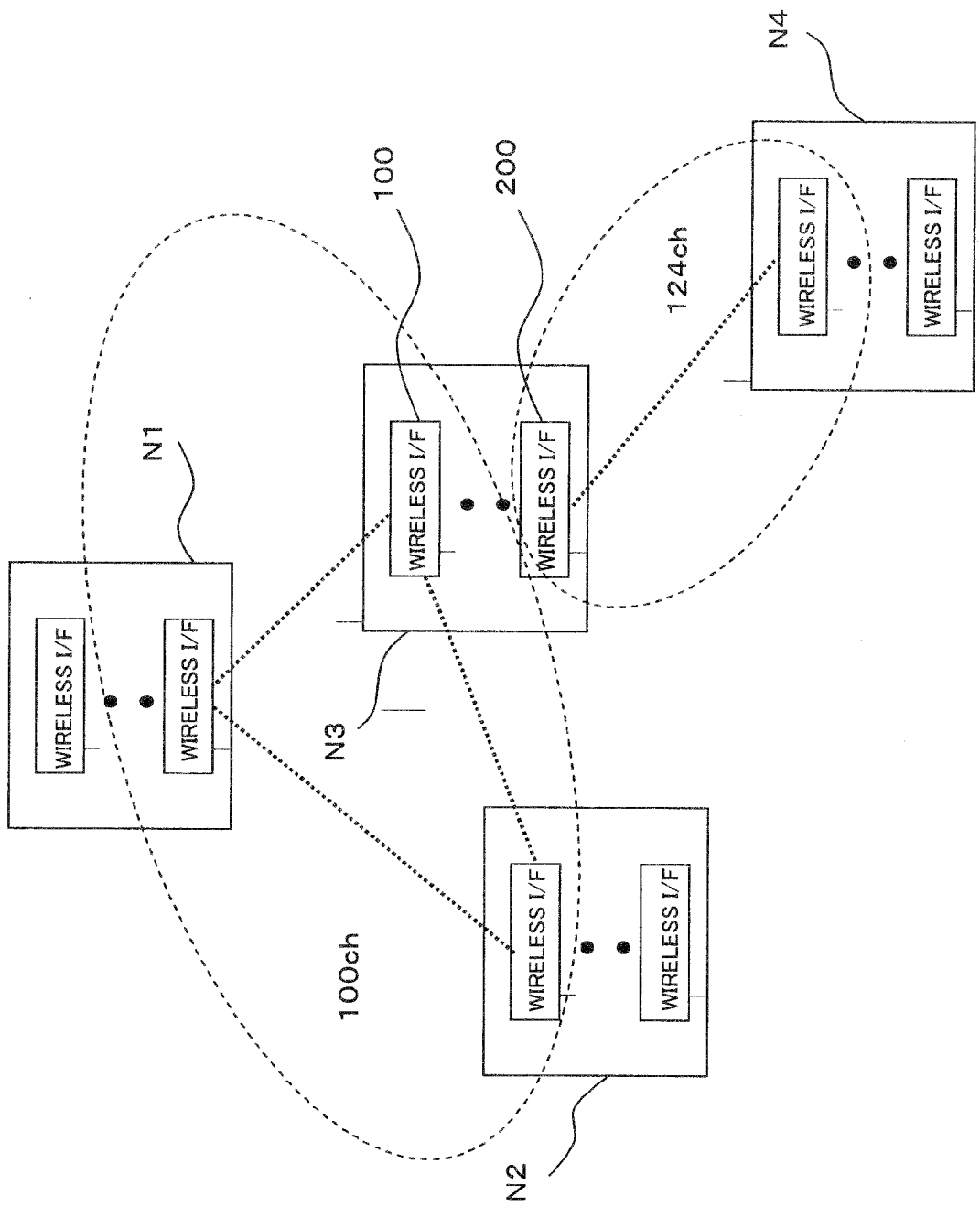
FIG. 27 is a view illustrating a problem in a case where a node mounts a plurality of wireless I/Fs and a resolution approach thereof.

Next, a problem occurring when a node has a plurality of wireless I/Fs will be described with reference to FIG. 27.

In case where a node mounts a plurality of wireless I/Fs, if a single wireless I/F (for example, a first wireless I/F 200) detects radar, and another wireless I/F (for example, a second wireless I/F 200) then detects radar, the second wireless I/F 200 may channel-switches to a channel of radar already detected by the first wireless I/F 100.

For example, it is assumed that in the node N3, the first wireless I/F 100 uses a channel 100 ch, and the second wireless I/F 200 uses a channel 124 ch. In this state, if the first wireless I/F 100 detects radar of a channel 100 ch, the first wireless I/F 100 performs a channel switch. Also, if the second wireless I/F 200 detects radar of a channel 124 ch, the second wireless I/F 200 performs a channel switch. At this time, if the second wireless I/F 200 channel switches to a channel 100 ch, the second wireless I/F 200 detects radar of a channel 100 ch already detected by the first wireless I/F 100. Since there is a high possibility that radar is detected again in channel 100 ch that radar is once detected, there frequently occurs a case where a channel switch is performed again. For this reason, an unnecessary channel switch occurs in a node which mounts a plurality of wireless I/Fs 100 and 200.

In the present embodiment, an approach below is applied to resolve the above-mentioned problem. The approach will be described below with reference to FIG. 27.

(Resolution Approach)

First, it is assumed that the node N3 uses a channel 100 ch at the first wireless I/F 100 and a channel 124 ch at the second wireless I/F 200. In this state, if the node N3 detects radar at the first wireless I/F 100, channel information (channel 100 ch) when the radar is detected is managed in the node N3. Next, the node N3 transmits a CSA frame to the adjacent nodes N1 and N2 and performs a channel switch.

Next, the node N3 performs a channel switch when radar is also detected at the second wireless I/F 200. In this instance, the node N3 is controlled to priority channel switch a channel of the second wireless I/F 200 to a channel (for example, 136 ch) other than channel information (channel 100 ch) managed in the node N3. Therefore, the node N3 can control not to channel switch to a channel 100 ch of radar detected at the first wireless I/F 100 when performing a channel switch of the second wireless I/F 200. As a result, there does not frequently occur a situation that the second wireless I/F 200 detects radar, thereby preventing an occurrence of unnecessary channel switch.

The node N3 can notify channel information of radar detected at the first wireless I/F 100 to another node N4 which shares a channel of the second wireless I/F 200. Therefore, the node N4 can manage channel information of radar detected in another node N3. Therefore, when the node N4 performs a channel switch, the node N4 can control to channel switch to a channel other than a channel that radar is detected by another node N3 based on the channel information.

In the above description, an example of a plurality of wireless I/Fs 100 and 200 mounted in the node N3 use different channels has been described, but the present invention can be applied to a case where a plurality of wireless I/Fs 100 and 200 can use a single channel. In this instance, when radar is detected by the first wireless I/F 100, the node N3 can control to also perform a channel switch of the second wireless I/F 200. Also, if the second wireless I/F 200 and the first wireless I/F 100 are in a non-communication state with each other, a channel switch can be performed when radar is detected by the second wireless I/F 200, similarly to the above description.

As described above, the present embodiment, the node manages channel information that radar is detected by the first wireless I/F 100. Also, when performing a channel switch of the second wireless I/F 200, the node controls by priority to channel switch to a channel other than a channel managed by itself. Therefore, when the second wireless I/F 200 performs a channel switch, the node can reduce switching to a channel of radar detected by the first wireless I/F 100, thereby preventing an unnecessary channel switch. Also, channel interference with radar can be reduced.

Also, the node notifies channel information managed by it to the other nodes which share a channel with the second wireless I/F 200 and manages channel information of the other nodes. Therefore, the other nodes can control to channel-switch to different channels when other wireless I/Fs use channel of channel information or can control to priority channel switch to a channel other than the channel information when a channel switch is performed at the next time.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the wireless communication system according to the present embodiment described above has bee described focusing on the processing operation for realizing the DFS function specified in the ITU-R recommendation M.1652 under a multihop circumstance, but various DFS functions can be applied if a DFS function that avoidance of interference with radar is considered can be realized like the DFS function specified in the ITU-R recommendation 1.652.

Also, in the present embodiment described above, a problem and a resolution approach have been independently described using a 1:1 correspondence relationship, but configurations for realizing respective resolution approaches can be provided independently or in a combined form.

A control operation at each node which configures the wireless communication system according to the present embodiment described above, can be executed using a hardware configuration, a software configuration or a combination configuration thereof.

In case where processing is performed using software, a program in which a processing sequence is recorded can be installed and executed in a memory within a computer which is configured on dedicated hardware. Alternatively, a program can be installed and executed in a general-purpose computer that various processing can be executed.

For example, a program can be recorded in a hard disc or a read only memory (ROM) as a recording medium in advance. Alternatively, a program can be temporarily or permanently stored (recorded) in a removable recording medium. Such a removable recording medium can be provided as so-called package software. A removable recording medium includes a floppy (registered trademark) disc, a Compact Disc Read Only Memory (CD-ROM), a Magneto optical (MO) disc, a Digital Versatile Disc (DVD), a magnetic disc, a semiconductor memory, and so on.

A program can be installed in a computer from a removable recording medium described above. Also, a program can be wirelessly transferred to a computer from a download site. Also, a program can be transmitted to a computer in a wireline method via a network.

The wireless communication system according to the present embodiment can be constructed not only to execute time-serially according to a processing operation in the embodiment described above but also to execute in parallel or individually according to a processing ability of an apparatus which performs processing or as necessary.

The wireless communication system according to the present embodiment can be configured or constructed by a logical combination of a plurality of apparatuses.

The present invention can be applied to an apparatus which performs a Dynamic Frequency Selection (DFS) in an Ad-Hoc mode under a multihop circumstance.

What is claimed is:

1. A wireless apparatus, comprising:
a DFS (Dynamic Frequency Selection) function which performs avoidance of interference with radar,
wherein when radar is detected, a Beacon frame is transmitted at a shorter transmission interval than a previously set transmission interval.

2. A wireless apparatus, comprising:
a DFS (Dynamic Frequency Selection) function which performs avoidance of interference with radar,
wherein when a CSA (Channel Switch Announcement) frame is received, a new CSA frame including a CSA element included in the CSA frame is transmitted.

3. The wireless apparatus according to claim 2, wherein the new CSA frame is transmitted after standby a random time.

4. A wireless apparatus, comprising:
a DFS (Dynamic Frequency Selection) function which performs avoidance of interference with radar,
wherein the wireless apparatus manages a resumption time that becomes a DFS Owner or a resumption time that enters a DFS Owner Recovery mode to assume the role of DFS Owner, compares the managed time to a resumption time that another wireless apparatus becomes a DFS Owner, and controls for quitting a DFS Owner according to the comparison result.

5. The wireless apparatus according to claim 4, further comprising:
a unit which includes and transmits the resumption time in a Beacon frame; and
a control unit which, when a Beacon frame is received, compares a resumption time of another wireless apparatus included in the Beacon frame to the managed time and quits a DFS Owner according to the comparison result.

6. A wireless apparatus, comprising:
a DFS (Dynamic Frequency Selection) function which performs avoidance of interference with radar,
wherein identification information for uniquely identifying each apparatus is included in a CSA (Channel Switch Announcement) frame, and when a plurality of CSA frames are received, a CSA frame to be adopted by the wireless apparatus among the plurality of CSA frames is determined according to identification information included in the CSA frame.

7. A wireless apparatus, comprising:
a DFS (Dynamic Frequency Selection) function which performs avoidance of interference with radar; and
a unit for notifying a channel list which is an index for a channel switch to an adjacent wireless apparatus when detecting radar, the channel list comprising a plurality of channels.

8. The wireless apparatus according to claim 7, further comprising:
a unit for measuring a received signal level for each radio channel and predicting an interference area of a radio channel that channel interference occurs for each radio channel, based on the received signal level of each radio channel; and
a unit for creating the channel list based on the interference area of the radio channel predicted for each radio channel.

9. A wireless apparatus, comprising:
a DFS (Dynamic Frequency Selection) function which performs avoidance of interference with radar,
wherein when a Beacon frame is received, if a Quiet Count included in the Beacon frame is smaller in value than a Quiet Count of the wireless apparatus, the Quiet Count of the wireless apparatus is changed to the Quiet Count included in the Beacon frame, and if the Quiet Count included in the Beacon frame is larger in value than the Quiet Count of the wireless apparatus, the wireless apparatus controls for ignoring the Beacon frame.

10. A wireless apparatus, comprising:
a DFS (Dynamic Frequency Selection) function which performs avoidance of interference with radar;
a plurality of wireless interfaces;
a management unit for managing information of a channel when a first wireless interface detects radar; and
a control unit for by priority switching to a channel other than a channel managed by the management unit when switching a channel of a second wireless interface.

11. The wireless apparatus according to claim 10, further comprising, a notifying unit for notifying information of a channel managed by the management unit to another wireless apparatus which shares a channel with the second wireless interface.

12. A wireless communication system, comprising:
a plurality of wireless apparatuses according to claim 1.

13. A control method which is performed in a wireless apparatus which has DFS (Dynamic Frequency Selection) function which performs avoidance of interference with radar, comprising a step of:
when radar is detected, transmitting a Beacon frame at a shorter transmission interval than a previously set transmission interval.

14. A control method which is performed in a wireless apparatus which has DFS (Dynamic Frequency Selection) function which performs avoidance of interference with radar, comprising a step of:
when a CSA (Channel Switch Announcement) frame is received, transmitting a CSA frame including a CSA element included in the CSA frame.

15. A control method which is performed in a wireless apparatus which has DFS (Dynamic Frequency Selection) function which performs avoidance of interference with radar, comprising a step of:
managing a resumption time that becomes a DFS Owner or a resumption time that enters a DFS Owner Recovery mode to assume the role of DFS Owner, comparing the managed time to a resumption time that another wireless apparatus becomes a DFS Owner, and controlling for quitting a DFS Owner according to the comparison result.

16. A control method which is performed in a wireless apparatus which has DFS (Dynamic Frequency Selection) function which performs avoidance of interference with radar, comprising a step of:
when a plurality of CSA (Channel Switch Announcement) frames in which identification information for uniquely identifying each apparatus is included are received, determining a CSA frame to be adopted by the wireless apparatus among the plurality of CSA frames according to identification information included in the CSA frame.

17. A control method which is performed in a wireless apparatus which has DFS (Dynamic Frequency Selection) function which performs avoidance of interference with radar, comprising a step of:
notifying a channel list which is an index for a channel switch to an adjacent wireless apparatus when detecting radar, the channel list comprising a plurality of channels.

18. A control method which is performed in a wireless apparatus which has DFS (Dynamic Frequency Selection) function which performs avoidance of interference with radar, comprising a step of:
when a Beacon frame is received, changing a Quiet Count of the wireless apparatus to a Quiet Count included in the Beacon frame if the Quiet Count included in the Beacon frame is smaller in value than the Quiet Count of the wireless apparatus, and controlling for ignoring the Beacon frame if the Quiet Count included in the Beacon frame is larger in value than the Quiet Count of the wireless apparatus.

19. A control method which is performed in a wireless apparatus which has DFS (Dynamic Frequency Selection) function which performs avoidance of interference with radar and a plurality of wireless interfaces, comprising steps of:
managing information of a channel when a first wireless interface detects radar; and
controlling by priority for switching to a channel other than a channel managed by the management steps when switching a channel of a second wireless interface.

20. A computer-readable medium storing a control program which allows a wireless apparatus which has a DFS (Dynamic Frequency Selection) function which performs avoidance of interference with radar to execute a processing of:
when radar is detected, transmitting a Beacon frame at a shorter transmission interval than a previously set transmission interval.

21. A computer-readable medium storing a control program which allows a wireless apparatus which has a DFS (Dynamic Frequency Selection) function which performs avoidance of interference with radar to execute a processing of:
when a CSA (Channel Switch Announcement) frame is received, transmitting a CSA frame including a CSA element included in the CSA frame.

22. A computer-readable medium storing a control program which allows a wireless apparatus which has a DFS (Dynamic Frequency Selection) function which performs avoidance of interference with radar to execute a processing of:
managing a resumption time that becomes a DFS Owner or a resumption time that enters a DFS Owner Recovery mode to assume the role of DFS Owner, comparing the managed time to a resumption time that another wireless apparatus becomes a DFS Owner, and controlling for quitting a DFS Owner according to the comparison result.

23. A computer-readable medium storing a control program which allows a wireless apparatus which has a DFS (Dynamic Frequency Selection) function which performs avoidance of interference with radar to execute a processing of:
when a plurality of CSA (Channel Switch Announcement) frames in which identification information for uniquely identifying each apparatus is included are received, determining a CSA frame to be adopted by the wireless apparatus among the plurality of CSA frames according to identification information included in the CSA frame.

24. A computer-readable medium storing a control program which allows a wireless apparatus which has a DFS (Dynamic Frequency Selection) function which performs avoidance of interference with radar to execute a processing of:
notifying a channel list which is an index for a channel switch to an adjacent wireless apparatus when detecting radar.

25. A computer-readable medium storing a control program which allows a wireless apparatus which has a DFS (Dynamic Frequency Selection) function which performs avoidance of interference with radar to execute a processing of:
when a Beacon frame is received, changing a Quiet Count of the wireless apparatus to a Quiet Count included in the Beacon frame if the Quiet Count included in the Beacon frame is smaller in value than the Quiet Count of the wireless apparatus, and for controlling for ignoring the Beacon frame if the Quiet Count included in the Beacon frame is larger in value than the Quiet Count of the wireless apparatus.

26. A computer-readable medium storing a control program which allows a wireless apparatus which has a DFS (Dynamic Frequency Selection) function which performs avoidance of interference with radar and has a plurality of wireless interfaces to execute a processing of:
managing information of a channel when a first wireless interface detects radar; and
switching by priority to a channel other than a channel managed by the management processing when switching a channel of a second wireless interface.

27. A wireless communication system, comprising:
a plurality of wireless apparatuses according to claim 2.
28. A wireless communication system, comprising:
a plurality of wireless apparatuses according to claim 4.
29. A wireless communication system, comprising:
a plurality of wireless apparatuses according to claim 6.
30. A wireless communication system, comprising:
a plurality of wireless apparatuses according to claim 7.
31. A wireless communication system, comprising:
a plurality of wireless apparatuses according to claim 9.
32. A wireless communication system, comprising:
a plurality of wireless apparatuses according to claim 10.

* * * * *